US006943665B2

(12) United States Patent
Chornenky

(10) Patent No.: US 6,943,665 B2
(45) Date of Patent: Sep. 13, 2005

(54) HUMAN MACHINE INTERFACE

(76) Inventor: T. Eric Chornenky, 125 Cambridge Rd., Bethel Park, PA (US) 15102

( * ) Notice: Subject to any disclaimer, the term of this patent is extended or adjusted under 35 U.S.C. 154(b) by 385 days.

(21) Appl. No.: 09/975,276

(22) Filed: Oct. 10, 2001

(65) Prior Publication Data

US 2002/0021601 A1 Feb. 21, 2002

Related U.S. Application Data

(63) Continuation-in-part of application No. 09/813,744, filed on Mar. 21, 2001.
(60) Provisional application No. 60/197,169, filed on Apr. 14, 2000, and provisional application No. 60/191,068, filed on Mar. 21, 2000.

(51) Int. Cl.[7] .......................... G05B 19/00; G06F 7/00; G08B 29/00; H04B 1/00; H04Q 1/00

(52) U.S. Cl. ....................... 340/5.83; 340/5.82; 283/70; 382/115

(58) Field of Search ....................... 340/5.6, 5.61–5.65, 340/5.82, 5.83, 5.52, 5.53; 365/200; 396/14, 15, 16, 17, 18; 382/115, 127

(56) References Cited

U.S. PATENT DOCUMENTS

| | | | | | |
|---|---|---|---|---|---|
| 4,183,060 | A | | 1/1980 | Barnette et al. | 358/128 |
| 4,196,347 | A | | 4/1980 | Hadley | 455/603 |
| 4,353,056 | A | | 10/1982 | Tsikos | 340/146.3 |
| 4,354,189 | A | | 10/1982 | Lemelson | 340/825.31 |
| 4,394,773 | A | | 7/1983 | Ruell | 382/4 |
| 4,488,370 | A | | 12/1984 | Lemelson | 42/70 R |
| 4,557,345 | A | | 12/1985 | Hamane et al. | 180/229 |
| 4,610,360 | A | | 9/1986 | Forslund | 209/518 |
| 4,614,366 | A | | 9/1986 | North et al. | 283/70 |
| 4,814,691 | A | | 3/1989 | Garbini et al. | 324/61 R |
| 5,016,376 | A | | 5/1991 | Pugh | 42/70.11 |
| 5,062,232 | A | | 11/1991 | Eppler | 42/70.11 |
| 5,229,764 | A | * | 7/1993 | Matchett et al. | 340/5.52 |
| 5,430,381 | A | | 7/1995 | Dower | 324/452 |
| 5,461,812 | A | | 10/1995 | Bennett | 42/70.11 |
| 5,581,484 | A | | 12/1996 | Prince | 364/259 |
| 5,612,689 | A | | 3/1997 | Lee, Jr. | 341/20 |
| 5,682,032 | A | | 10/1997 | Philipp | 235/422 |
| 5,719,950 | A | | 2/1998 | Osten et al. | 382/115 |
| 5,751,835 | A | * | 5/1998 | Topping et al. | 382/115 |
| 5,779,114 | A | | 7/1998 | Owens | 224/193 |
| 5,787,185 | A | | 7/1998 | Clayden | 382/115 |
| 5,903,225 | A | | 5/1999 | Schmitt et al. | 340/825.31 |
| 6,038,666 | A | * | 3/2000 | Hsu et al. | 713/186 |
| 6,057,540 | A | | 5/2000 | Gordon et al. | 250/221 |
| 6,097,301 | A | | 8/2000 | Tuttle | 340/693.9 |
| 6,114,862 | A | | 9/2000 | Tartagni et al. | 324/662 |
| 6,182,892 | B1 | | 2/2001 | Angelo et al. | 235/380 |
| 6,201,980 | B1 | * | 3/2001 | Darrow et al. | 600/347 |
| 6,236,037 | B1 | | 5/2001 | Asada et al. | 250/221 |
| 6,275,213 | B1 | | 8/2001 | Tremblay et al. | 345/156 |
| 6,449,472 | B1 | * | 9/2002 | Dixit et al. | 455/404.1 |
| 6,484,260 | B1 | * | 11/2002 | Scott et al. | 713/186 |
| 6,532,298 | B1 | * | 3/2003 | Cambier et al. | 382/117 |

* cited by examiner

*Primary Examiner*—Michael Horabik
*Assistant Examiner*—Nam V. Nguyen
(74) *Attorney, Agent, or Firm*—James Ray & Associates

(57) ABSTRACT

A human machine interface (10) for use in situations requiring authorized access. The human machine interface (10) includes a validator controller (12) and a data transmitter (14). The validator controller (12) includes a validator status actuator (16) in communication with a validator receiver (18) via a validator logic circuit (20). The validator status actuator (16) is configured to process and perform actions based upon data signals (22) received by the validator receiver (18). The data transmitter (14), which is in contact with a human nail (24), transmits the data signal (22) to the validator controller (12).

38 Claims, 7 Drawing Sheets

HUMAN MACHINE INTERFACE

CROSS-REFERENCE TO RELATED APPLICATION

This patent application is a continuation-in-part of U.S. patent application Ser. No. 09/813,744, filed Mar. 21, 2001, which claims the priority of U.S. Provisional Patent Application Ser. No. 60/191,068, filed Mar. 21, 2000, and U.S. Provisional Patent Application Ser. No. 60/197,169 filed Apr. 14, 2000.

BACKGROUND OF THE INVENTION

1. Field of the Invention

The present invention relates generally to control devices and, in particular, to control devices utilizing human nail characteristics and positions for validation and/or control.

2. Description of the Prior Art

Throughout the world, security systems are used for various purposes, including: locking and unlocking mechanisms, enabling and disabling events, allowing and disallowing access, etc. All of these security device functions require some type of validation method or device to distinguish a valid user from an invalid user. For example, U.S. Pat. No. 4,196,347 to Hadley discloses a security system that uses a radiation signal emanating from a user's key to unlock a door. In addition, a magnetic field, as opposed to an electrical signal, can be used in the authorization process, as demonstrated in U.S. Pat. No. 5,016,376 to Pugh. Similarly, U.S. Pat. No. 4,354,189 to Lemelson is directed to a switch and lock activating system wherein the user wears a finger ring that contains a code, such that when the user places the ring near a validation device, the lock unlocks or the door opens. A common drawback to these types of systems is the ease of obtaining the validating device. If the key or ring is misplaced or stolen, the finder or thief is then able to access or unlock the lock without further validation.

In a recent push towards firearm control and safety, many governments have instituted gun safety programs, resulting in gun "locking" patents, both in the United States and abroad. These inventions prevent a gun from being operated by accident or by an unauthorized user. For example, U.S. Pat. No. 4,488,370 to Lemelson and U.S. Pat. No. 5,461,812 to Bennett both describe weapon control systems that use an electrical device, worn on the finger or wrist of a user, in combination with a validation device, to unlock the trigger mechanism of a gun. U.S. Pat. No. 5,062,232 to Eppler is directed to a safety device for firearms wherein the user wears a glove containing a device that emits a code which, when validated by a gun detector, permits the gun to be fired. As with the general security devices discussed above, using rings, gloves and other externally worn devices leads to loss or misplacement by the authorized user or theft by an unauthorized user.

Beyond the possible loss or theft of the validation device, other drawbacks are apparent in the prior art. The prior art devices are not amenable to retrofitting. In using a set or pre-set validation signal (whether electronic, magnetic, or other type), they are easily duplicated. If the signaling device is obtained or the signal is obtained from another source, an unauthorized user has access and/or control over the locked system. Also, the prior art devices are not inherently "struggle-proof", preventing a thief from actuating or wrestling the signaling device from the authorized user. Still further, even absent a thief, using a separate signaling device normally leads to an authorized user losing or forgetting the device, thereby disabling the user from unlocking or accessing the intended object.

Also utilized throughout the world are control devices for controlling various machines and devices, such as appliances, machinery, computers or other consumer and industrial machinery. For example, a person uses a television remote control to control the changing of channels, volume setting, etc., of the television. However, the user must locate the remote control, pick it up, and, if it is not easily locatable, search for the remote. Also, such a remote control must be returned to a known location, so that it is not subsequently lost or replaced.

Similarly, a computer mouse often requires the user to move the mouse around the mouse pad, and move the user's hands back and forth between the mouse and the keyboard. Therefore, using a mouse, together with a keyboard, to control the computer is inherently inefficient and time-consuming. In addition, the computer mouse requires valuable desk space, and tends to be damaged or stolen when used in a public situation.

It is therefore an object of the present invention to provide a security apparatus that is not easily lost by or stolen from an authorized user. It is another object of the present invention to provide a security device that is easily retrofitted into existing mechanisms and systems. It is a further object of the present invention to provide a security apparatus that is unusable or effectively unusable during or after a struggle situation in which the valid user loses possession of his firearm. It is a still further object of the present invention to provide a security apparatus with a signaling device that produces a non-duplicative or non-discoverable signal, increasing the security aspect of the device. It is another object of the present invention to provide a control device that requires minimal time and energy to remotely operate a machine or appliance.

SUMMARY OF THE INVENTION

In order to overcome the drawbacks of the prior art, I have invented an apparatus including a validator controller having a validator status actuator in communication with a validator receiver via a validator logic circuit. The validator receiver is configured to receive data signals, and the validator status actuator is configured to process and perform actions based upon those data signals. The present invention also includes a data transmitter, which is in contact with a human nail and in communication with the validator controller. In operation, the data transmitter transmits a data signal, the validator receiver receives the data signal, and the validator logic circuit processes the received data signal. Finally, the validator status actuator performs an action based upon the received data signal.

The present invention also includes a method of enabling or disabling a controlled event, including: providing a validator controller having a validator status actuator in communication with a validator receiver via a validator logic circuit, the validator status actuator configured to process and perform actions based upon data signals, and the validator receiver configured to receive signals, a data transmitter in contact with a human nail and in communication with the validator controller; receiving a data signal by the validator receiver; processing the received data signal by the validator logic circuit; and performing an action by the validator status actuator based upon the received data signal.

When used as a security apparatus, the present invention utilizes the physical characteristics of the human nail as the source or basis of the data signal. When used as a remote control device or other such human machine interface, the present invention utilizes either the physical characteristics of the human nail or the relative position or orientation of the human nail, with respect to an external point.

The present invention, both as to its construction and its method of operation, together with additional objects and advantages thereof, will best be understood from the following description of specific embodiments when read in connection with the accompanying drawings.

DETAILED DESCRIPTION OF THE PREFERRED EMBODIMENTS

Figure 1:
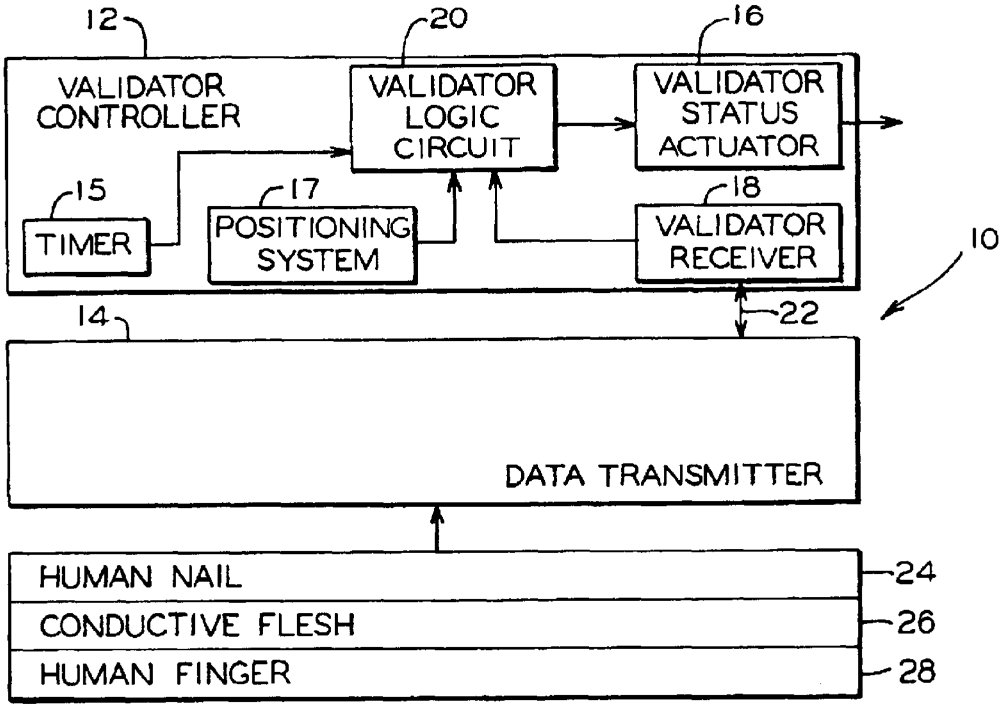
FIG. 1 is a block diagram of an apparatus according to the present invention.

The preferred embodiment of the present invention is a human machine interface, generally designated 10, shown in FIG. 1. The human machine interface 10 has two main elements; a validator controller 12 and a data transmitter 14. The validator controller 12 contains a validator status actuator 16, which is in communication with a validator receiver 18 via a validator logic circuit 20 (such as an embedded controller). Further, the validator status actuator 16 is configured to process and perform certain actions based upon the value or characteristics of a data signal 22. The data transmitter 14 is in contact with a human nail 24 and, in addition, the data transmitter 14 is in communication with the validator controller 12.

The human nail 24, together with conductive flesh 26 beneath the human nail 24 and a human finger 28 or toe, create a complete human nail conductive circuit 30. The capacitance value per unit of area of the human nail conductive circuit 30 is a semi-unique or individualized value, which will vary from one person to the next. In this manner, each person will have a semi-unique code or value associated with his or her unique human nail conductive circuit 30. This semi-unique value is or is translatable into the semi-unique data signal 22 and is transmitted towards the validator controller 12 by the data transmitter 14. In addition, the data signal 22 may also include, from memory and/or from real-time measurements and/or calculations, other unique characteristics of the user, such as nail dimension, nail curvature, nail coloration, nail groove configuration, fingerprints, operator's pulse, unique finger markings, finger opacity, a unique serial number, values from a randomized area of dielectric material, values from a randomized area of resistive material, change in resistance as the user pushes against a hard surface or another finger or digit, or a visual profile of the forefinger area, facial image, retinal image, voice characteristics, optical characteristics and/or patterns of the flesh under the nail, data resulting from an algorithm, etc. The present invention may be considered a human nail 24 thickness quasi-biometric device and/or a data tag, which uses the physical, mechanical and/or electrical characteristics of the human nail 24 to create a removal detection system to disable the device. Other methods of removal detection may rely on the physical strength properties of the human nail 24, such as breakable wires glued separately on or within the human nail 24, such that, upon detection of a break in the wires, the device disables itself.

Using the total resistance formed by the conductive flesh 26 under the nail 24 between electrodes or wires is another manner in which to associate a semi-unique value to the user. If there are two or more wires through the human nail 24, the total resistance between those two electrodes is indicative of the total amount of flesh on the forefinger of the user. This may be correlated with the degree of flesh discoloration under the nail due to pressure on the finger at that time to yield a more unique profile. The resistive measurement, periodically checked by a watchdog timer 15, will also strongly indicate when the nail 24 is removed from the forefinger in a transplant attempt. Also, these electrodes may be used to provide tactile feedback when a voltage is applied.

If the human nail 24 is transplanted onto another person, there is a degree of likelihood that the other person will have a different amount of flesh on his or her finger, yielding a different resistance measurement range.

Further, more wires may be used to get a more detailed profile of the finger resistance. Other factors influencing finger resistance would be the ratio of flesh to bone diameter and whether pressure is being placed on the human nail 24 or on the bottom of the finger of the user. Finally, as the wires move forward on the user's human nail 24 through its natural growth rate, the resistance will slowly change in an anticipateable fashion. This may be useful in assisting in detecting a transplanted finger or the data transmitter 14 placed on an artificial conductive material. To best measure resistance with accuracy using a simple circuit, two wires can be utilized, which connect directly to the resistor (conductive flesh 26). This presents a complex time versus resistance profile as the human nail 24 grows or the finger is pushed on a solid surface. It is also envisioned that a watchdog timer 15 may be periodically and/or sporadically used to verify that the resistance or capacitor plate's formed capacitance is in a user-specific range, and additionally, verify whether the human nail 24 has been moved or removed. It is recognized that although the physical properties of an individual's nail, surrounding areas or electrode measurements of its surrounding areas gradually change, those changes are generally not fast enough to present erroneous readings on a short term basis, such as in a struggle situation, or may be compensated for by other means, such as measuring and utilizing ambient humidity as a factor in the nail's properties calculations. Additionally, especially in the case of using resistance measurements of the flesh under the nail, the values acquired while there are no forces applied to the forefinger may be most accurate in measuring factors such as closeness to the end of the nail or cumulative nail growth. An efficient manner of detecting human nail 24 removal, is a method causing decreased capacitance and increased voltage and may use a high-impedance-input voltage limiter, in parallel with the nail-derived capacitor, such as a specially designed ESD semiconductor device. When the nail is removed, capacitance decreases, the voltage increases, and the current partially discharges the capacitor.

The resistance of a volume, region or layer of the nail 24 itself (as opposed to or combined with the flesh under the nail 24) albeit very high, may also be used as an individualized measurement or a means of removal detection.

In a struggle situation or in a situation wherein an attempt is being made to physically force a person to actuate the validator controller 12, the proximity of the attacker's finger will typically add capacitance and/or alter the data signals 22, such that the human machine interface 10 will not function, enable and/or validate. Alternatively, the human machine interface 10 may be provided with an overall timeout function human machine interface 10 ceases to function within a predetermined time period. Alternatively, the components of the data transmiter 14 may be constructed or formed such that if any attempt to move or remove them occurs, the data signals 22 are re-randomized or the human machine interface 10 is destroyed or disabled. In the event that the human machine interface 10 is damaged, destroyed or expired, an alternative means of validation may be provided. Additionally, the human machine interface 10 may be configured to "trap" the finger, hand or arm of an operator who has failed to pass the validation test.

The validator receiver receives the data signal 22 and, via the validator logic circuit 20, the data signal 22 is communicated to the validator status actuator 16. Once the validator status actuator 16 receives a data signal 22, which it verifies itself or is verified by the validator circuit logic 20, the validator status actuator 16 performs an action or conveys data based upon this received and verified data signal 22. For example, in use with a firearm, the validator status actuator 16 would enable or disable the triggering mechanism of the firearm, based upon the veracity of the data signal 22. In this instance, the validator controller 12 may be mounted on the trigger guard of a firearm.

Figure 2:
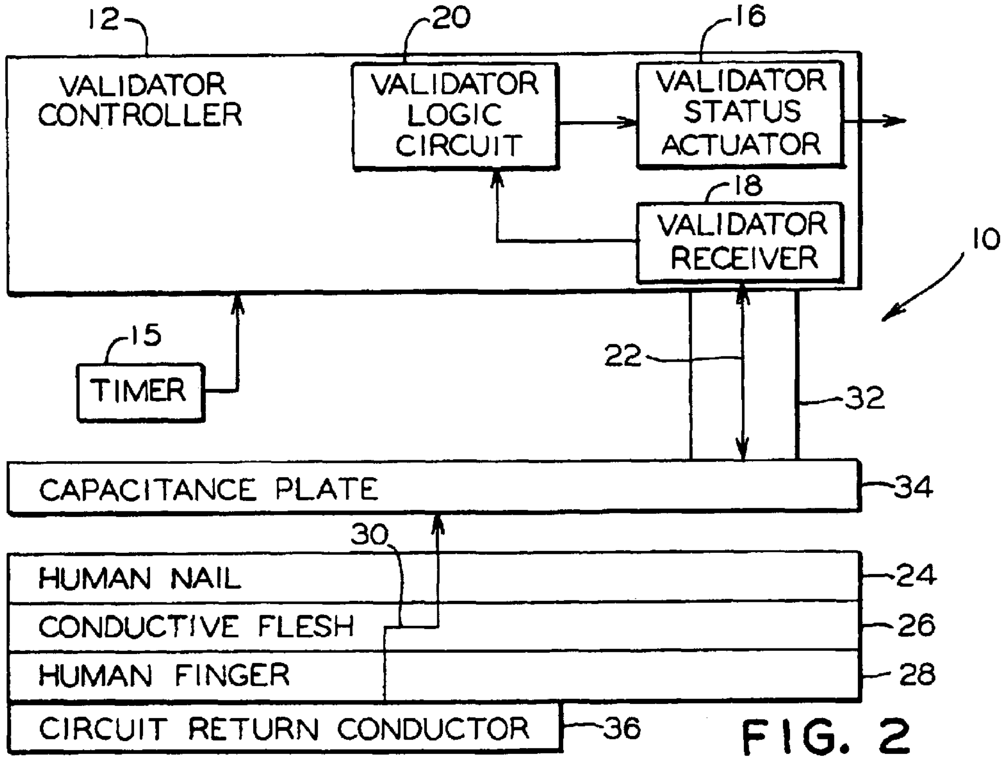
FIG. 2 is a block diagram of a second embodiment of an apparatus according to the present invention.

In a second embodiment of the present invention, as illustrated in FIG. 2, the human machine interface 10 further includes a direct physical connection element 32 between the validator receiver 18 and the data transmitter 14. Alternatively, the direct physical connection element 32 may be combined and integrated with the validator receiver 18. This direct physical connection element 32 may be a wire or multiple wires or other substrate, which allows the data signal 22 to travel through or on it. Further, in this embodiment, the data transmitter 14 is a capacitance plate 34, which is secured directly to or in conductive contact with the human nail 24. In order to complete the human nail conductive circuit 30, a circuit return conductor 36 is provided on the human finger 28 or toe. The data signal 22, in the form of a capacitance value, travels through the direct physical connection element 32 and is received by the validator receiver 18. The capacitance plate 34 may have a gold-leaf conductive coating or a human nail 24 having a gold-plating therein trimmed to specific values by trimmed area to facilitate the creation and measurement of capacitance values. In addition, the human machine interface 10 may use an array of capacitors 34 that function as a bar code. Human nail 24 modifications, such as thinning or thickening the area under just one of the capacitance plates 34, makes it more difficult to estimate another person's capacitance by measuring the thickness of their nail. This would decrease the possibility of a person attempting to duplicate the user's capacitance.

Figure 3:
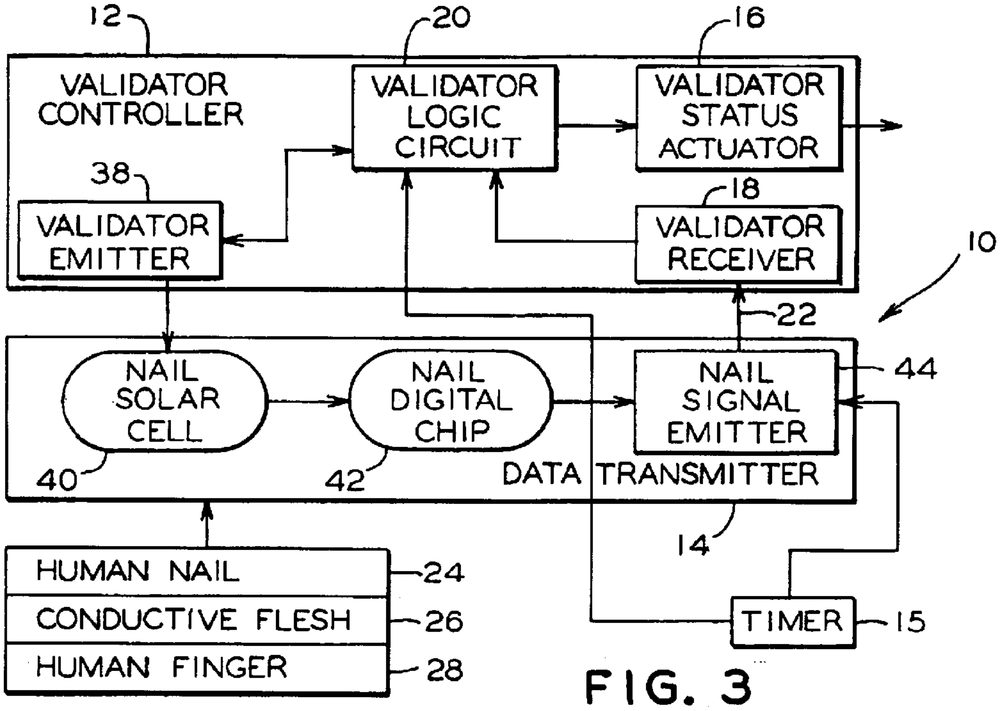
FIG. 3 is a block diagram of a third embodiment of an apparatus according to the present invention.

A third embodiment of the present invention is illustrated in FIG. 3. In this embodiment, the validator controller 12 further includes a validator emitter 38 configured to emit signals (such as electromagnetic waves, light, RF, infrared or ultraviolet) towards the data transmitter 14. Additionally, the data transmitter 14 includes a nail solar cell 40, preferebly mounted directly to the human nail 24, which receives signals, preferably light signals, from the validator emitter 38. This nail solar cell 40 powers the data transmitter 14 which emits a data signal 22. Further, the nail solar cell 40 data may be replaced or supplemented with a higher speed device, e.g., a phototransistor. The data transmitter 14 also includes a nail digital chip 42, preferebly mounted directly to the human nail 24, which is configured to communicate with both the nail solar cell 40 and a nail signal emitter 44 using digital logic. The nail digital chip 42 receives nail-specific data from memory or the nail analog chip 48 and/or information from the nail solar cell 40 and communicates the data signal 22 to the nail signal emitter 44, which, in turn, emits the data signal 22 towards the validator controller 12. The validator receiver 18 then receives the data signal 22 and passes the data signal 22 through the validator logic circuit 20 for processing and verification for the validator status actuator 16.

Figure 4:
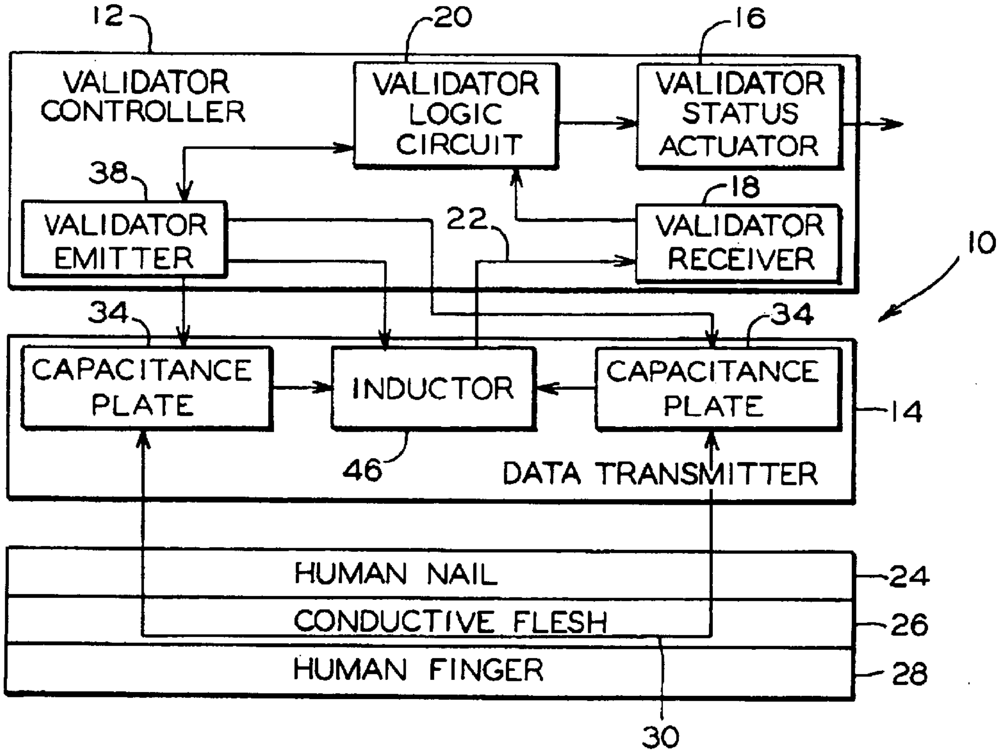
FIG. 4 is a block diagram of a fourth embodiment of an apparatus according to the present invention.

Turning to FIG. 4, in the fourth embodiment of the present invention, the data transmitter 14 further includes capacitance plates 34 (as in FIG. 2) and an inductor 46, creating a resonance circuit. The inductor 46 is in communication with the capacitance plates 34, which measure the capacitance value via the creation of a specific resonant frequency through the conductive flesh 26 circuit. This unique capacitance value (or data signal 22) is transmitted through the inductor 46 and towards the validator controller 12. In order to transmit this data signal 22 to the validator receiver 18, the validator controller 12 further includes the validator emitter 38 discussed above. However, as opposed to emitting solar energy or light, the validator emitter 38 of this embodiment emits an electromagnetic wave or "pulse" towards the capacitance plates 34 and the inductor 46. In this embodiment, the inductor 46 is formed by a concentric circle of conductive material and is connected to two relatively larger areas of conductive material forming the two capacitance plates 34. The capacitance dielectric is the human nail 24, and the conductive flesh 26 is a common plate-connection for the capacitor. Other transponder-based technology may be utilized to transmit the data signal 22.

Figure 5:
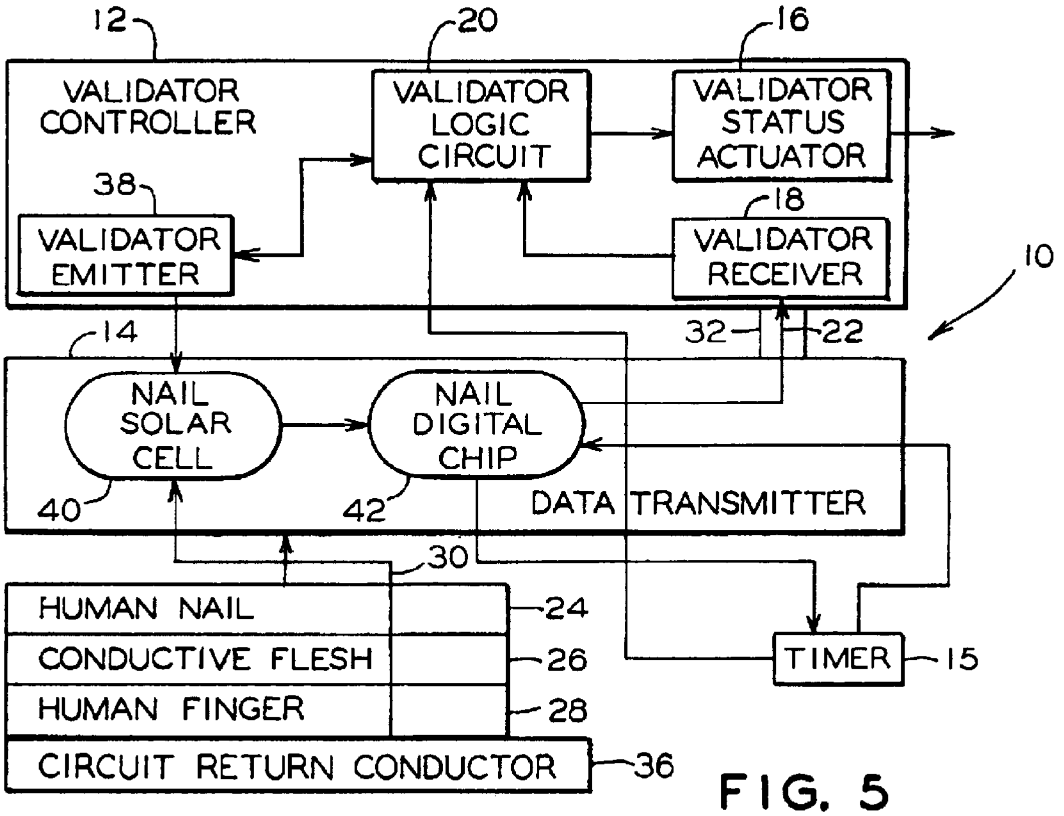
FIG. 5 is a block diagram of a fifth embodiment of an apparatus according to the present invention.

The fifth embodiment of the present invention is illustrated in FIG. 5. In the fifth embodiment, the validator controller includes the validator emitter 38, which emits an electromagnetic radiation signal to the nail solar cell 40. Using the circuit return conductor 36 on the human finger 28 or toe to complete the human nail conductive circuit 30, the nail solar cell 40 emits the data signal 22 (along with power) to the nail digital chip 42. The nail digital chip 42 transmits the data signal through a direct physical connection element 32 or contact to the validator receiver 18. As before, the data signal 22 passes to the validator status actuator 16 via the validator logic circuit 20. The circuit return conductor 36 can be considered to be an electrical common between the data transmitter 14 and the validator receiver 18.

Figure 6:
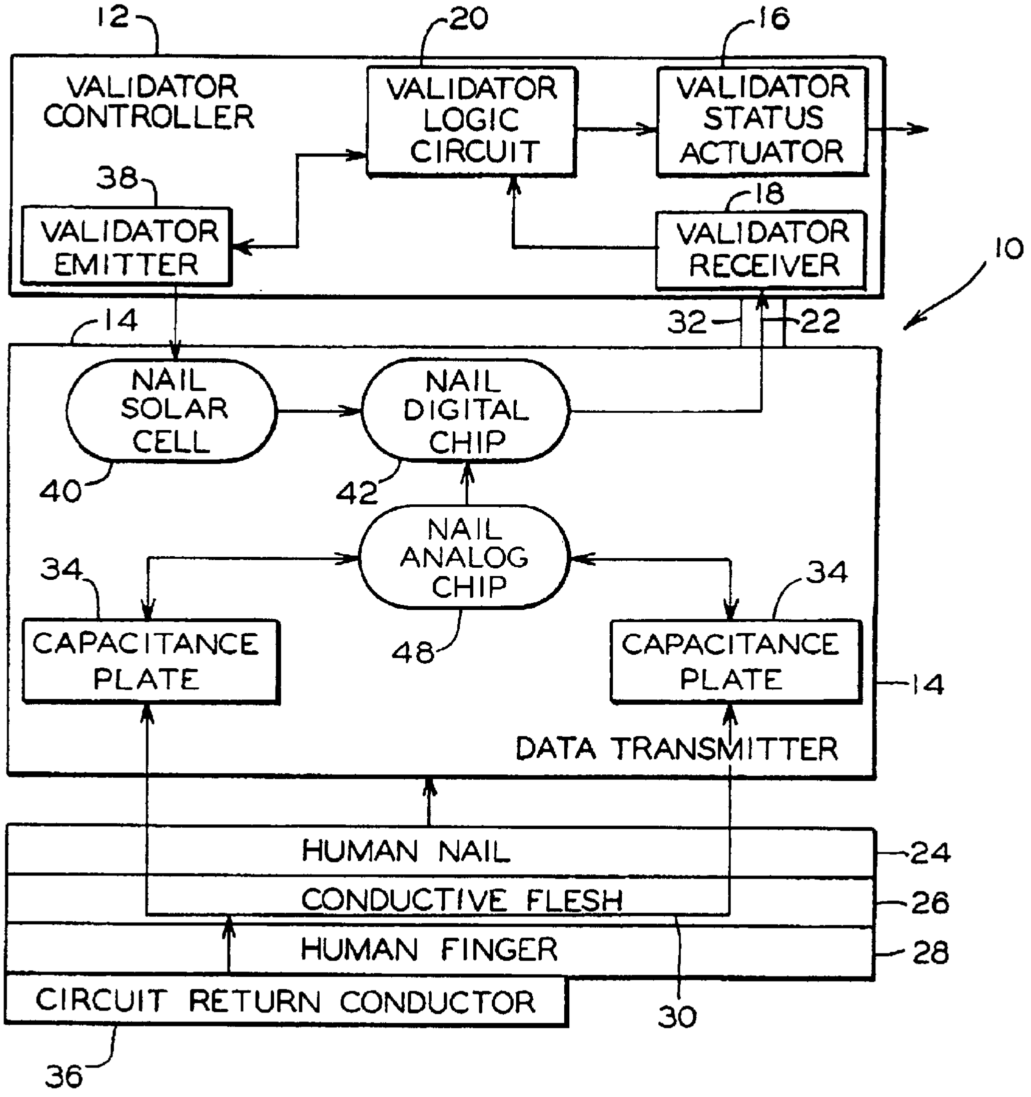
FIG. 6 is a block diagram of a sixth embodiment of an apparatus according to the present invention.

In the sixth embodiment of the present invention, as illustrated in FIG. 6, the validator emitter 38 emits a signal to the nail solar cell 40, which is in communication with the nail digital chip 42 in the data transmitter 14. The data transmitter 14 further includes a nail analog chip 48 to measure the capacitance between capacitance plates 34 secured to the human nail 24 and the circuit return conductor 36 secured to a human finger 28 or toe. This nail analog chip 48 transmits this measured capacitance value to the nail digital chip 42, which transmits the data signal 22 through a direct physical connection element 32 to the validator receiver 18. The data signal 22 then proceeds as discussed above.

Figure 7:
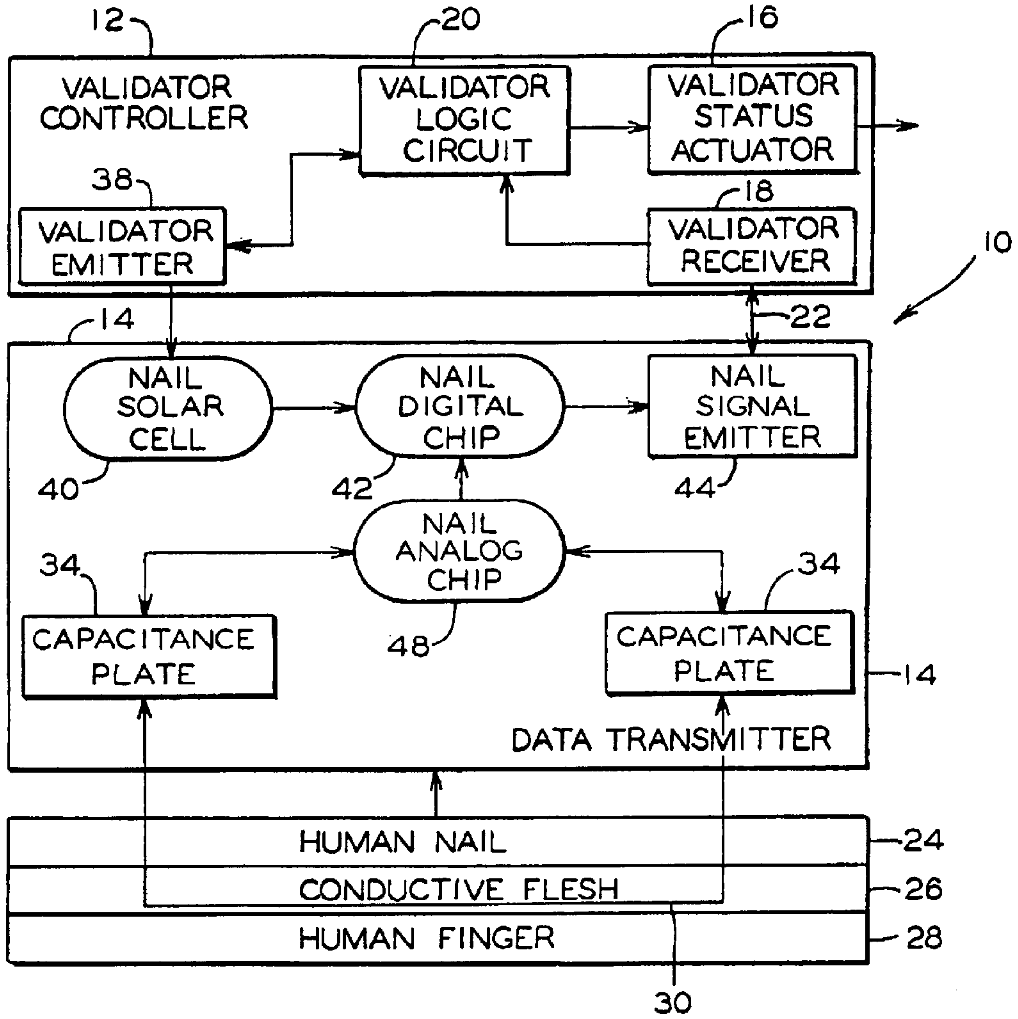
FIG. 7 is a block diagram of a seventh embodiment of an apparatus according to the present invention.

A seventh embodiment of the present invention is illustrated in FIG. 7. In this embodiment, the validator controller 12 includes a validator emitter 38, and the data transmitter 14 includes a nail solar cell 40 to receive signals from the validator emitter 38 and transmit power and signals to a nail digital chip 42. The data transmitter 14 also includes capacitance plates 34, which, as discussed above, create a capacitance value based upon the capacitance through the conductive flesh 26. The nail analog chip 48 measures this capacitance value and transmits this value to the nail digital chip 42. The nail digital chip 42 transmits this data signal 22 to the nail signal emitter 44 and, thereafter, the nail signal emitter 44 emits this signal towards the validator controller 12. The validator receiver 18 receives the signal and proceeds as discussed above. The nail analog chip 48 may utilize inductors, capacitors, resistors, semiconductors, conductors, or antennas to modify the data of the data signals 22 emitted.

Figure 8:
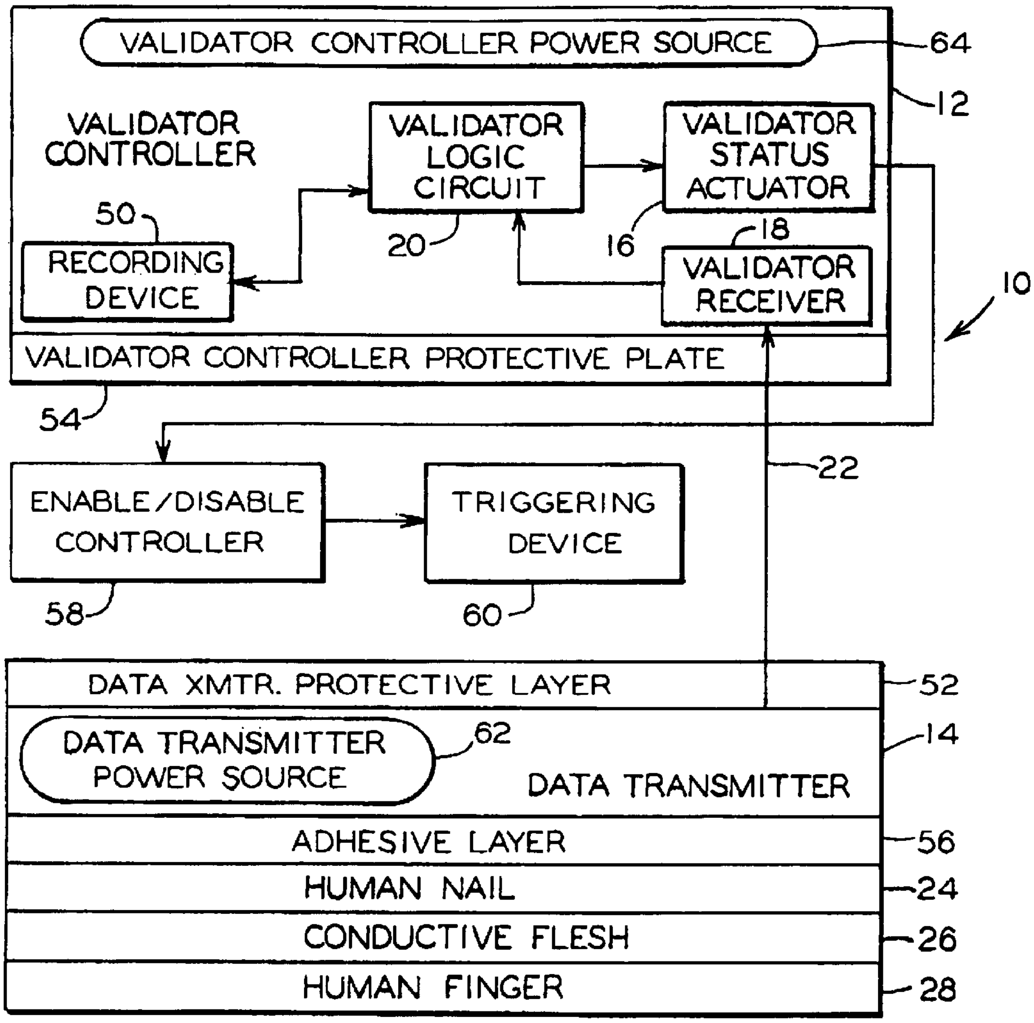
FIG. 8 is a block diagram of an eighth embodiment of an apparatus according to the present invention.

In an eighth embodiment, as illustrated in FIG. 8, the validator controller 12 may also include a recording device 50 in communication with the validator status actuator 16 via the validator logic circuit 20. This recording device 50 is configured to log specific events or conditions occurring within or outside of the human machine interface 10 and any associated devices and/or also may be located in or in communication with the data transmitter 14. Further, as discussed hereinafter, the recording device 50 may constitute a number of devices capable of receiving information from the human machine interface 10 or from an external source. For the firearm example, the recording device 50 can log the number of locking and unlocking occurrences. If the validator controller 12 or the data transmitter 14 are configured to randomly or sporadically check resistance, capacitance, temperature, pulse or other data occurrences, the recording device 50 may log the results of these occurrences. This would increase the difficulty in transplanting or attempting to transplant the data transmitter 14 onto another person or onto an artificial device designed to simulate the owner's characteristics. If an unusual reading would occur, the device may disable itself or go into a non-enabling state temporarily or permanently. The eighth embodiment of the present invention also includes a data transmitter protective layer 52 covering and protecting the data transmitter 14. This data transmitter protective layer 52 is formed such that it will not interfere with the communication of data signals 22 between the data transmitter 14 and the validator controller 12. Similarly, a validator controller protective layer 54 may be provided to cover and protect the validator controller 12. As with the data transmitter protective layer 52, the validator controller protective layer 54 should not interfere with any communication of signals between the validator controller 12 and the data transmitter 14.

It is envisioned that the data transmitter 14 is either attached to or in close proximity with the human nail 24. Additionally, this attachment may be temporary or permanent. An adhesive layer 56 maybe utilized between the data transmitter 14 and the human nail 24. This adhesive layer 56 can be a compound which allows the data transmitter 14 to be non-permanently secured to the human nail 24. For example, using a water-based glue as the adhesive layer 56 would allow the data transmitter 14 to be removed only under running water at a certain temperature of water. This is especially valuable if there is a region of resisting compound between the nail 24 and the data transmitter 14, such that the measured compound resistance value is modified if the data transmitter 14 is moved or removed.

The advantage of using a restricted, semi-fluid area of resistance, insulator-compound or conductor compound whose profile is established at placement time and a) whose profile remains essentially unchanged for the duration of the time the user is wearing the data transmitter 14 and b) whose profile is based on an area of a fixed gap typically between the data transmitter 14 and the wearer's nail 24 and c) whose "final" profile is established at placement time and is strongly influenced by the motions of the individual placing the data transmitter 14 onto the human nail 24 is as follows; it creates unpredictable further randomized artificial characteristics to be read by the data transmitter 14. Also, the grooves and ridges configuration under the nail 24 provide a profile, such that if the data transmiter 14 is removed and replaced on the same nail 24 or another nail 24, it is highly unlikely to return to the same profile and, hence, will influence any electrical readings based on its physical configuration.

As shown in FIG. 8, the human machine interface 10 may also be provided with an enable/disable controller 58 in communication with the validator status actuator 16. This enable/disable controller 58 can control a triggering device 60, such as a firearm trigger device or other locking mechanism, enabling or disabling the triggering device 60. This is particularly useful when the present invention is used as a security apparatus, or required for other secure transactions.

Further, the data transmitter 14 may have a data transmitter power source 62, and the validator controller 12 may have a validator controller power source 64. The validator controller 12, as well as the data transmitter 14, may have timeout periods, used to save energy during periods of non-use. These timeout periods are useful when the data transmitter 14 and validator controller 12 have long-term individual energy sources 62 and 64 (i.e., thermopiles, batteries, ultra capacitors, fuel cells, etc.) or short-term energy sources 62 and 64 (i.e. solar cells, piezoelectric elements, motion derived power generation elements, etc.) These timeout periods can also be combined with the watch dog timer function and recording device 50 in the data transmitter 14. In providing power to the data transmitter 14, some design requirements such as cost optimization before convenience optimization may find two wires to be more feasible if there is no wire through the human nail 24. Because the capacitance of the fingernail is so low, it may be less practical to provide/pump enough alternating current of a high enough frequency and voltage through it. Using the typical method of supplying power by using two wires might best be used to complete the power circuit typically between the power source 62 or 64. Alternately, if one of the power wires goes to the data transmitter 14 from the validator controller 12, then a second wire through the human nail 24 which allows a small amount of current to comfortably proceed through conductive flesh 26 to a common metal conductor (i.e., a gun) and back to the validator controller 12, completing a current loop. Any power wires may also be used for signal transfer between the data transmitter 14 and the validator controller 12. It is also envisioned that the data signal 22 may be in the form of energy, electromagnetic waves, electrostatic energy or any other suitable, transmittable signal.

Figure 9:
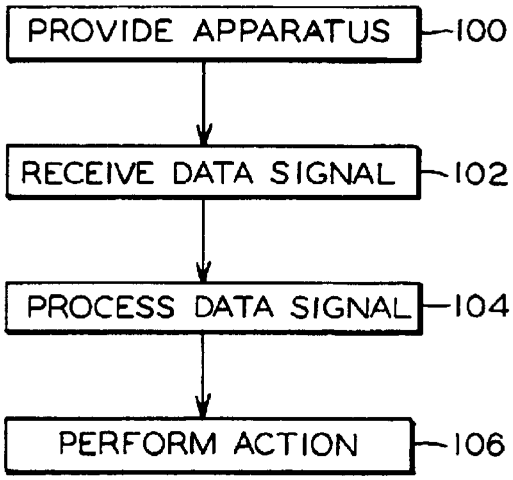
FIG. 9 is a block diagram of a method according to the present invention.

The present invention also includes a method of enabling or disabling an event, as shown in FIG. 9. The method includes the steps of: providing a validator controller 12 having a validator status actuator 16 in communication with a validator receiver 18 via a validator logic circuit 20, the validator status actuator 16 configured to process and perform actions based upon data signals 22, and the validator receiver 18 configured to receive data signals 22, a data transmitter 14 in contact with a human nail 24 and in communication with the validator controller 12 (step 100); receiving data signals 22 by the validator receiver 18 (step 102); processing the received data signals 22 by the validator logic circuit 20 (step 104); and performing an action by the validator status actuator 16 based upon the received data signals 22 (step 106). The data signal 22 may be based on the physical characteristics of the human nail 24, the relative position of the human nail, with respect to an external point, based on data previously logged in the data transmitter 14, data from the validator controller 12 and/or the state of the data transmitter 14.

The data transmitter 14 may be used as a remote controller device, may provide a user with tactile feedback, may provide a user with visual feedback by using an LCD display and may transmit the data signal 22 by modulating an electronic shutter to modulate a signal reflected or retroflected from a selected device back to a selected device or use polarization to further allow the individual to modify the signal. The data transmitter 14 may act generally as a transponder. An example of tactile feedback that may be useful is a "shock", "tingle" or vibration feedback. This tactile/shock feedback can be very useful to indicate a transaction did or did not take place. Tactile feedback may also be generated by a piezoelectric element placed on the human nail 24. Also, a variety of feedback pulse trains, pulse counts, strengths, combinations or even a Morse code may be useful. An external shock pulse to the operator's finger (either through wires going through the human nail 24 or at another location on the forefinger) can prompt the user to measurably respond with an intelligent action at a specific time, e.g., pushing the finger forward, down, etc. This also indicates that the user is not unconscious and is not having his or her finger mechanically manipulated without his or her knowledge. The user may also respond with useful information, such as status, password, or duress code or action, including specific minor movements in the finger, which convey data used in deciding validity and/or performing an action. The validator status actuator 16 and the enable/disable controller 58 may use a solenoid, muscle wire, magnetic fluid, hydraulics, pneumatics or other suitable means to implement the desired action or convey desired data upon receipt of the verified data signal 22. Further, the human machine interface 10 may be adapted to contain additional logic to incorporate applicable secure transmission algorithms and/or encryption algorithms and/or challenge-response methods within the human machine interface 10 or between the human machine interface 10 and external devices or to the fingernail data transmitter. When ultra secure validation is desired or an interloper is suspected, identical rolling randomized codes stored only in the data transmitter 14 and validator logic circuit 20 may be used to secure the data signal 22. This is useful when the validator controller 12 is at a remote location from the data transmitter 14 and the data signal 22 is conveyed by insecure communication infrastructure. The individual components of both the validator controller 12 and the data transmitter 14 may be provided in separable layers. It is also envisioned that the human machine interface 10 may be adapted to detect the presence of an interposing or adjacent foreign object, such as a finger blocking the data signals 22, or detect the modification of the human nail 24 characteristics. The capability to monitor the status of a trigger-operated device and provide tactile feedback in response to the status is useful for, as an example, alerting the user whether a saw motor is drawing too much current or if a staple gun is nearly out of staples.

If the validator controller 12 has communicated with the data transmitter 14 within the last few seconds, it is reasonable to assume that a medical operation to transplant the finger, toe or human nail 24 onto someone else has not occurred in that short period of time. In this case, a more detailed and accurate (and time consuming) validation process may not be necessary. Generally, the more resolution used to measure any electrical value, including capacitance, the longer it takes to complete the measurement. While this may save a few milliseconds, in a high-speed firearm trigger actuation event, the time savings may be valuable. Further, if the user has gone on vacation and the validator controller 12 has not communicated with the data transmitter 14 during that time period, it may be desired that the human nail 24 characteristics be scrutinized in greater detail. For example, the expected change in growth of the human nail 24 could be verified along with a password, blood type, fingerprint, etc. If the human nail 24 has not grown the expected amount, the possibility that it has been mounted on an artificial substrate or other substance is significant. An inherent advantage of the human machine interface 10 is its reliance on the human nail 24, which is a constantly growing substrate. Due to its constant growth, the human nail 24 has a variable validity period from about 0–4 months depending upon the placement location of the device and other biological factors such as time of year. This is particularly useful in situations where the permanent right of access or use is not desired.

Some implementations of the device can be likened to a transponder or an RFID transponder device on the fingernail connected to a capacitor whose value is based on the capacitance of the user's fingernail. The value influences the RFID device's response. A disadvantage of the RFID technology is that it is easier to intercept or "jam" radio communications than an optical frequency-based transponder. Also, it may easily interfere or be confused with or make separate simultaneous transmissions more technically difficult with other RFID devices nearby, such as on an adjacent nail 24.

A further enhancement to the human machine interface 10 would be an electrical ground shield above the capacitor plates to isolate the plates from any capacitance variation formed between the top of the plates measuring the human nail 24 capacitance and a conductive area above them, such as the metal body of a firearm. This would add a fixed capacitance value to the overall reading, but would minimize a smaller, but variable, capacitance value resulting from a different positioning of the finger or a different configuration of any conductive or metallic areas in proximity to the validator controller.

A further distinguishing characteristic between individuals is a human nail 24 curvature profile. It can be measured with a flat, non-conforming area of multiple plates, or an array of capacitor plates glued to or positioned above the wearer's nail 24. Alternately, it can be measured resistively by a fixed array of contacts above the surface of the human nail 24. The nail 24 thickness profile can be measured in a similar manner as that described above, with the exception that the array of capacitive plates would roughly conform to the curvature of the nail 24.

The data transmitter 14 may further incorporate a "low-power-watchdog-circuit" which would place a voltage charge on capacitor plates, typically those that measure the nail 24 capacitance. The low-power-watchdog-circuit would have an electronic device whose purpose is to "avalanche" or "short-out" or conduct electricity if the voltage goes significantly above a value greater than the initial charge placed on the plates, such as a specially designed ESD event or avalanche-effect semiconductor. If the human nail 24 or data transmitter 14 is removed from the individual while the data transmitter 14 is in an 'off' or low powered state, the capacitance between the aforementioned plates would go down causing the voltage between those plates to go up and the avalanche device to conduct much of the charge away. When the data transmitter 14 is again placed on the user or a false substrate or false user, and the data transmitter14 "wakes up" for its normal watchdog timer functions, or is otherwise activated, the voltage charge across the plates will then be substantially lower than its original charge and its circuitry will detect this lower voltage and conclude the data transmiter 14 has been tampered with while it was in the low-powered or sleep state and disable itself or erase its data preventing further unauthorized use. It is recognized that leakage current through the nail 24 may require this process to be refreshed at a rate of over 10,000 times per second.

Another embodiment of the data transmitter is a simple plate above or in approximate contact with the human nail 24 that roughly parallels it. The dimensions of the plate and the overall capacitance(s) formed (between the plate and the conductive flesh 26, and the distances between the plate and the conductive flesh 26) create a resonant circuit(s), which, when energized, by a device such as a microwave transmitter, resonate at specific resonant frequency(s) dependent on the components and factors mentioned above and create a microwave transponder-like device. In this embodiment, no wire is needed between the data transmitter 14 and the validator receiver 18.

The device can also store information (such as when and which validator controller 12 associated with its firearm was fired or lock unlocked or validator controller 12 activated) in the data transmitter's nail digital chip 42 or simply store data from the validator controller 12. This can be later downloaded or read for a number of purposes, including verification that the action was correctly performed. Also, other validator controllers 12 can read this data to further test and discriminate whether the user has the authorization to perform the next action the user is requesting. An example of this would be not allowing access to a medical operating room unless the user recently entered a decontamination room. It is also recognized that some applications may require negotiation or a "conversation" between the data transmitter 14 and the validator controller 12, such as an exchange of passwords or other data. Another example would involve unlocking access to a room with a specific level of toxic gas such as carbon monoxide that is determined to be below the wearer's calculated accumulated daily threshold of safe toxic concentration, which only the data transmitter 14 would know from its past logged data and calculations.

The human machine interface 10 works symbiotically with a fingerprint reader. Since the device can store data such as a person's identification, expected fingerprint pattern, and other security or authorization or classification, it enables a fingerprint reader which is "unfamiliar" with this new set of prints to validate that the individual whose prints it belongs to is authorized or belongs to a category of people authorized to gain access, perform functions, etc. Combined with a fingerprint reader, the resulting human machine interface 10 also can decrease the fingerprint reader's error rate of false positives or false negatives.

The data transmitter 14 can be configured to receive and transmit signals not only to a validator controller 12 above the nail 24 or at a significant distance from the nail 24, but also to a validator controller 12 underneath the finger or using the finger flesh property as a light or electromagnetic energy conducting conduit. A good application of this would be used with push-button switches which would have a validator controller built into them or connected to them via a fiber-optic link allowing the smart switch to verify the identification of the user and his validity before allowing the switch to perform the requested action. A fingerprint reader on switches would be too slow, large, unreliable and costly to implement efficiently.

The data transmitter 14 and its fingernail digital chip 42 can store or exchange messages or data with validator controllers 12 and run programs internal to it for security verification of validator controllers 12, data logging purposes and/or timing purposes, etc. For example, the data transmitter 14 may calculate in its nail digital chip 42 that the wearer should not be allowed access into an area of hazardous gas until two hours after leaving another such area. The validator controller 12 may be integrated with the data transmitter 14 and, further, may be mounted on or adjacent the human nail 24. This allows for individual, security, personal, business or financial data to be copied or exchanged between two individuals. For example, "introduction" or "place of business" information may be passed in the place of a business card, or to allow entry into a building. This information can be temporarily or permanently passed between two individuals. In addition, a person can validate that he or she was at a specific location at a specific time, as in the case of a timecard replacement situation or guard station checkpoint. The data transmitter 14 is typically not continuously in communication with the validator controller 12. The data transmitter 14 may still log user data or perform state change requests for future communication with the validator controller 12.

The data transmitter 14 can further incorporate a microphone (optionally in communication with the recording device 50) to recognize its wearer's voice and voice commands, to change its state or authorize it to release or make available specific categories or areas of information to the validator controller 12 requesting that information be made available to the next validator controller 12 to be read. Examples of this would be medical records, or specific credit information. Voice commands may instruct the performance of operations on stored, current or future data, such as perform select and calculate only on dental, medical or financial transaction. Alternately, a simpler use of a microphone interface is to signal the wearer's intentions to the data transmitter 14 to recognize the sound of the user "snapping his fingers" or tapping a surface to indicate a specific desired state change.

The data transmitter 14 can further incorporate a small fingerprint reader or keypad into its top surface (optionally as the recording device 50), such that an individual can pre-authorize his data transmitter 14 to release information only by briefly placing a preselected digit of another of his fingers or sequence of his fingers over the top of his data transmitter 14, the data transmitter 14 recognizing it as his digits, and authorizing a request by comparing it with a pre-stored configuration of his fingerprints. Once the pre-authorization is complete, the data transmitter 14 may then release the data requested to the validator controller 12 when prompted by the validator controller 12. Other sequences of individual's fingerprints read may further allow the individual to issue commands to the data transmitter 14, such as "warn me" if any data of a personal/financial category is requested by a validator controller 12 before releasing said data.

An additional method of detecting wearer input into the human nail 24 would be the use of a piezoelectric sensor mounted on the human nail 24 which detects nail deflection and/or the forces and stresses applied to it.

It is also envisioned that, by sliding a data transmitter 14 (with a microphone or accelerometer in it) across a prefabricated grooved or bumpy surface (such as or similar to a textured barcode or frequency modulated fingernail file), numerous and specific wearer instructions or other data can be conveyed to the data transmitter 14. Such prefabricated surfaces can be conveniently mounted on a user's belt, thereby allowing the conveyance of information. For example, the user can effectively convey to the data transmitter 14 the wearer's desire that the data transmitter 14 release data normally not disclosed to the validator controller 12, such as social security information.

An alternative signaling operation includes a normal bar code reader (optionally as the recording device 50) attached to or incorporated with the device. Since some of the embodiments of the device may also have an LED and light sensitive receiver, they may also be used for the bar code feature, if present. A set of contacts on the top of the data transmitter 14 can also be used to enable the wearer to signal requests to the data transmitter 14. For example, if the data transmitter 14 is on the index finger, the wearer can place his middle finger over the top of his index finger and left-most electrical contacts on the data transmitter 14 allowing current to flow between the contacts, allowing the data transmitter 14 to sense this flow as a request to change to a more secure state and/or log a timestamp for future reference.

The value of multiple fingernails with a data transmitter 14 on each of them is the following: it allows for redundancy in the event one falls off, malfunctions or becomes invalid due to fingernail growth, causing capacitors to extend beyond the conductive flesh 26 and drastically changing their value. An example would be while on an extended vacation. It allows for different levels, categories, or amounts of information to be stored and consciously selected by the wearer and offered to the validator receiver 18. For example one worn only on the small finger may only validate the user's name and address whereas one worn on the middle finger may have financial information available to a validator controller 12. The wearer would also be able to carry or have available more total data and functions.

If the nail solar cell operates at the light energy area of the spectrum and not the RF area, it can also use ambient light to recharge a power source or battery in the data transmitter 14, especially during periods it is not being used to conununicate with the validator controller 12. This power may be used for other purposes such as periodic and/or sporadic checks by watchdog timer 15 of wearer's pulse rate and/or capacitance and/or amplifying or boosting the signal later to the validator receiver 18, to allow it to operate over greater distances.

A small transparent keypad may be placed on top of the data transmitter 14 to enable the wearer to enter codes to change the state of or to authorize the data transmitter 14 to release or make available specific categories or areas of information to the validator controller 12 requesting it. For example, that information might include medical records or specific credit card numbers.

A further safety mechanism can be introduced wherein using a simple breakable link (circuit with a wire going from data transmitter 14 to the nail 24 where it is glued and back to data transmitter 14), a switch typically in contact with the nail 24 or the continuous sensing for a correct capacitance value, a data transmitter 14 removal can be detected. In the event the data transmitter 14 falls off the wearer or is removed without pre-authorizing the removal, the link breaks and the data transmitter 14 erases or disables its own data from being transmitted.

It should be noted that the nail 24 is the closest, most useable area of the fingertip, which is also the area of the body fastest and most varied in motion and states. Hence, it is most able to communicate those states to the device mounted on the fingernail 24 and/or to a validator controller 12, switch or the outside world.

A further enhancement would be to provide a means to tune or adjust an "adjustment-constant" which is later added to the capacitative value and would be useful when replacing a data transmitter 14 so that no revalidation/re-introduction is needed. A special replacement security state would be useful to prevent this feature being used for falsification or tampering. Therefore, a method of eliminating the need for a re-introduction phase after the data transmitter 14 is removed and replaced onto the nails is to send a special secure control signal to the data transmitter 14 along with a trimming or adjustment value to be added to the raw real-time capacitance value, so that the new resulting value of capacitance sent to the validator controller 12 will be identical or close enough to the old capacitance that the data transmitter 14 does not need to be re-introduced to the validator controller 12 to re-recognize the individual and perform the desired action. Alternatively, a secure "accept this new value as correct and adjust your constants accordingly" signal may be used to do this. This enables the new position of the data transmitter 14 to be recognized by another stand alone validator controller 12 afterwards.

Thus when the data transmitter 14 must be replaced to a position further back on the human nail 24 due to the human nail 24 growth, the wearer may choose not to revalidate/re-introduce the data transmitter 14 to the validator controller 12, instead allowing the logic in the data transmitter 14 to re-discern that the new, slightly different human nail 24 characteristics, such as the capacitance reading, is-actually that of the authorized wearer. An alternative method of securely notifying the data transmitter 14 that the new nail values are to be considered valid and to readjust itself is achieved by sending the data transmitter 14 a unique, lengthy electronically-encoded password. The data transmitter 14 may then not necessarily transmit the true human nail 24 capacitance or other characteristic to the validator controller 12, instead sending a new or constant pseudo-reading which may still be based on the individual's new nail 24 characteristics that is representative of the wearer, thus validating the wearer. In this manner, the data transmitter 14 "vouches" for the wearer.

Another enhancement would be to use an acoustic wave pulse created by an ultrasonic transducer which can be sent through the nail 24 into the flesh 26 under it or along the nail 24 and read back, to further verify nail 24 thickness and/or verify there is no unauthorized artificial object under the nail 24, which might be used in an attempt to create an artificial nail flesh. It can also be used to verify the other dimensions of the nail 24, i.e. width and length, etc.

It should be noted that the human machine interface 10 measures a resultant capacitance formed by the area(s) of the plates, any conductive adhesives, any insulating adhesive compounds, any other interacting structures such as electrostatic shielding, an aggregate measurement effected by the individual's grooves and the dielectric constant of the wearer's nail, and does not necessarily always measure the wearer's fingernail thickness.

The individual's nail groove configuration can be read by placing an array of electrodes on top of a resistive compound, with said compound filling the valleys and still covering the peaks of the nail grooves, such that the resistance read between the electrodes is thus being influenced by the depth and position of the nail grooves and peaks.

Additionally, if the plates are glued to the nail 24, (as is done in the preferred embodiment) the glue will and should have a different dielectric constant than the individual's nail 24 and the groove dimensions and ridge dimensions as well as the thickness of the glue layer over top of all the ridges will influence the overall resulting capacitance measurement, and may add a physical randomizing factor at application or re-application time.

An accelerometer can also be used to read finger motions and convert and interpret them as commands to the data transmitter 14 logic chip or validator controller 12, instead of, or in addition to pressing the finger flesh, in such a manner as to cause under the nail discoloration or by using a keypad, other digital or analog inputs or other means for the wearer to issue commands or data to his data transmitter 14 chip. It should be noted that the nail can be manipulated to discolor without pressing against a surface but by pushing up or down or even against another nail.

When the present invention is used as a remote control apparatus, an accelerometer or tilt sensor presents particularly useful data which is passed or logged and later passed between the data transmitter 14 and the validator controller 12. Based on the position of the nail 24 (and the data transmitter 14, in contact with the nail 24) in space (or with reference to an external point in space), the human machine interface 10 creates an entirely new approach to the remote control of machinery, appliances, etc. The user can simply rotate his or her nail 24, or move the nail 24 up and down, to compose and send a useful signal from the data transmitter 14, which is attached to or adjacent the nail 24. In such an embodiment, the data transmitter 14 may include the accelerometer or other input device, to allow the user to, for example, turn a television volume up by simply twisting or moving his or her nail 24. Similarly, it is envisioned that an accelerometer may not be needed, if the human machine interface 10 simply relies on the nail colorization occurring when the user presses two fingers together, or when the user stresses the nail 24 with another nail 24 in a variety of directions or relies on detecting a polarization angle of the data signal 22 created by rotating the data transmitter 14. As discussed in detail above, the use of nail 24 color could pass an appropriate signal from the data transmitter 14 to the validator controller 12. Other methods for the wearer to communicate with the data transmitter 14 include tilt switches, tilt detectors, piezoelectric elements, detecting a specific motion over a magnet, creating a conductive path between bare contacts on the data transmitter 14, etc.

Using the present invention as a remote control device, the user may press harder or lighter, or against different digits (all fitted with the data transmiter 14), such that a variety of different signals, and therefore control information, could be sent to a remote device. The use of the present invention as a remote control would ovbviate the need for a separate, and easily lost or misplaced, remote control unit.

Figure 10:
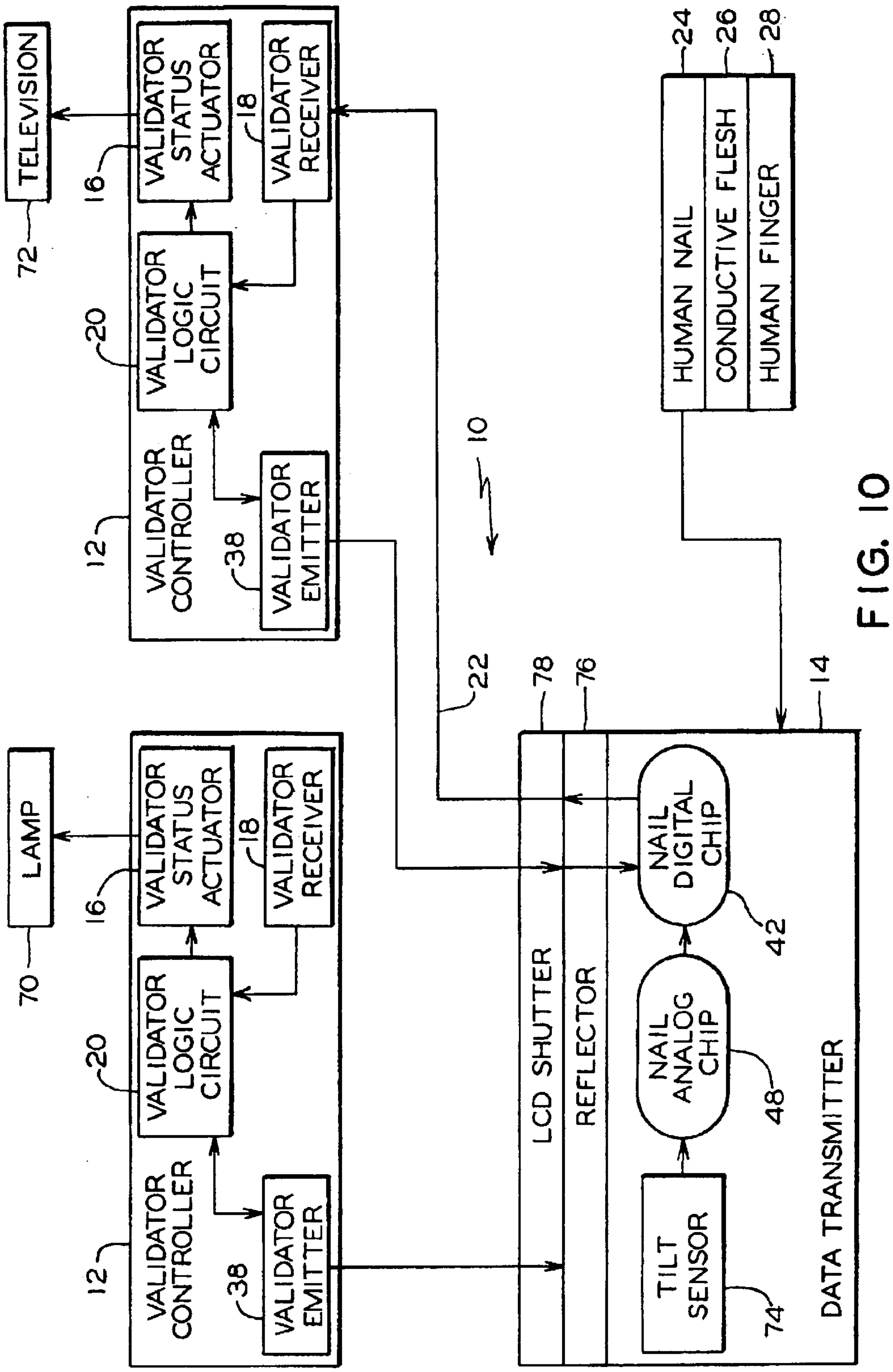
FIG. 10 is a block diagram of a ninth embodiment of an apparatus according to the present invention.

A ninth embodiment directed to such a human machine interface (or remote control device) is illustrated in FIG. 10. This human machine interface 10 acts as a remote control for one or multiple devices. In this example, the human machine interface 10 acts as a remote control for a lamp 70 and a television 72. A user attaches the validator controller 12 to both the lamp 70 and the television 72 (or the validator controller 12) is integrated with the electrical or structural system of each unit). In this embodiment, a tilt sensor 74 would be used and integrated with the data transmitter 14. This tilt sensor 74 senses and outputs a signal based upon the orientation of the data transmitter 14, as attached or in operative relationship to the human nail 24. When the user moves his or her nail 24, the tilt sensor 74 moves and outputs a signal to the nail analog chip 48, which outputs the signal to the nail digital chip 42. The nail digital chip 42 then logs, accumulates and/or interprets and then transmits the data signal 22 towards the validator receiver 18.

The human machine interface 10 also includes, attached to or integrated with the data transmitter 14, a directional reflector 76. The directional reflector 76 is a typical bike-type reflective surface with a grid which reflects a signal from only a limited angle, such that if the incoming signal is at a predetermined angle greater than allowed, the incoming signal is not reflected, and is instead absorbed. Attached to or in front of or adjacent the reflector 76 is an electronic shutter 78, for example, an LCD shutter.

In operation, the signal is emitted from the tilt sensor 74, based upon the orientation of the data transmitter 14, and the analog signal is transmitted to the nail analog chip 48. Next, the signal is passed to and converted in the nail digital chip 42. Based on the signal from the tilt sensor 74 (or a signal based on the physical characteristics of the nail 24, e.g., nail color), an encoded or pulsed signal is sent through the shutter 78, and towards the validator controller 12. The signal 22 reaches the validator receiver 18, and is interpreted to a command in the validator logic circuit 20. If the signal is verified, the validator status actuator 16 actuates a switch and controls the device (lamp 70 or television 72).

The validator controller 12 emits a signal, typically light, from the validator controller 12. If the signal is received by the directional reflector 76 at too great of an angle, the reflector 76 (e.g., with directional black parallel plates) absorbs the signal and no return signal 22 is received by the validator receiver 18. However, if the angle is acceptable, meaning that the user is pointing towards or roughly towards the validator controller 12, the directional black parallel plates do not absorb the signal, and instead the signal 22 is returned as modulated by the shutter 78. In the specific example, if the user points his or her nail 24 at the television 72, and rotates the nail 24, the tilt sensor 74 emits the signal 22 towards the validator controller 12 on the television 72, thereby performing a control action on the television 72. Since the lamp 70 and its associated validator controller 12 are not in "line" with the reflector 76, no signal is emitted towards the validator controller 12 on the lamp 70. Therefore, the lamp 70 will not perform an action, having been given no signal. In place of the tilt sensor 74, an accelerometer and/or polarization filters may be utilized.

Aside from the obvious benefits of using a fingertip human machine interface 10 (light weight, quickness and minimization of loss situations), there are many other benefits to the present invention. The remote control can be a "universal" remote control. Other data can be sent with the data signal 22, thereby allowing the validator controller 12 to identify the user, and, for example, only allow an adult to view certain channels. The present embodiment is more sanitary in public situations, and does not require sight for use. Further, the human machine interface 10 can eliminate the need for multiple remote control units, and can be made secure as described in detail in connection with the security apparatus embodiment.

In another tilt sensor 74 (or accelerometer, polarization filter, etc.) application, the user can "write in the air" certain data or symbols, which inputs or creates certain digital equivalents in the data transmitter 14 and/or validator controller 12. This data can be logged later and/or be conveyed to an optical data transponder/logger or Personal Digital Assistant (PDA). The human nail 24 characteristics include the usage or movement characteristics of the forefinger, since the human nail 24 is a uniquely unused area of the forefinger, and also since all motions associated with finger movement are expressed in the fingertip, and, hence, human nail 24. The human nail 24 characteristics include the ability to reflect the wearer's finger-based actions, such as writing, gesturing, shaking hands, pushing buttons, pulling a trigger, picking up, moving or manipulating the location of an object.

It is, therefore, a characteristic of the human nail 24 to have the ability to reflect almost any action the individual performs with his finger. Since most "valuable" actions done by a wearer during work or recreation are either verbal or hand-based, the human nail 24 is in a unique position to monitor and/or record such hand-based actions. Further, it is in a unique position to intercept and be aware of any actions meant solely to signal it. Due to the speed and immediacy of finger motions, the interpretations can be achieved quickly and often while carrying items in the same hand, or in the midst of other actions. Additionally, if an accelerometer or tilt sensor 74 is used to calculate the position of the nail, a positioning system, generally designated 17, considered to be a "personal positioning logging system" is envisioned. Also, the continuous logging of all human nail 24 characteristic data along with user created data or state change requests described herein and a time stamp for the data may be useful.

Additional examples of further securing the present invention include securing information transmitted between the data transmitter 14 and the validator controller 12 using quantum encryption or, possibly, an emitter may be included to "jam" an attempt to intercept communication signals within the human machine interface 10.

Also, the orientation characteristic of the human nail 24 (along all three axes) may be measured and transmitted or logged and later transmitted. This could also be done using gravitometers, polarization, accelerometers, flywheels, mass twist detection devices, etc.

It is also recognized that the validator receiver 18 can or may be built into or fabricated on the same chip as the validator logic circuit 20, depending on semiconductor fabrication advances and economic feasibility and they then can be considered as one component.

It is envisioned that the positioning system 17 of the validator logic circuit 20 may include a Global Positioning System (GPS) or implementing software, which, when used in connection with the recording device 50, can track and record position events. For example, the device can track and log the GPS coordinates of the validator controller 12 and/or the data transmitter 14. Also, the device can track the time of an event, as well as other associated events, such as compass heading, container status, quantity of triggering, and other data regarding a mobile device. Another example is in using this GPS-enabled system to track and log the location of a vehicle especially when the ignition is turned on or off by the user's data transmitter 14. Further, this tracking and logging system can be used to track an employee's entrance to or exit from a building, even without a GPS capability. More detailed or personal data can be collected using an accelerometer 74 on or in the data transmitter 14 or validator controller 12, the accelerometer can be used to log the relative location of the human nail 24 (and, hence, the finger tip) and to receive state change requests or information from the user.

Another use of the GPS capability couples the GPS system with compass direction signals on the validator controller 12 or data transmitter 14 in a firearm application. For example, the GPS and compass direction signals can be acquired by a firearm and sent through the validator controller 12 (or acquired directly by the validator controller 12) to the data transmitter 14 to log the exact time, location and direction that every single round is sent to. Additionally, the data transmitter 14 may contain a list or map of areas of permissible GPS coordinates and/or compass directions, such that the data transmitter 14 can decide and disallow the discharge of the firearm if the fireann's owner has wandered into the wrong area or becomes "turned around" and is firing in the wrong area or towards the wrong direction.

In this application, the validator controller 12 or data transmitter 14 can further decide the allow/disallow status of a firearm discharge request, based upon the type of firearm held or range of firearm held, since firearm information can also be sent through the validator controller 12 to the data transmitter 14. Such applications include hunting, where the hunter unwittingly wanders close to a populated area.

Although not limiting, the human machine interface 10 is particularly useful with trigger-operated tools, storage units, locking mechanisms, software-logic keys, personal identification systems, credit validation systems, computer access, fund transfers and other e-commerce transactions, authorized access situations, third-party information transactions, transportation and travel transactions, Internet transactions, pharmaceutical transactions, licensing, registration, visa and passport transactions, etc.

In a specific example involving the user of the present invention as a security apparatus, the validator controller 12 is mounted on a trigger guard of a firearm in front of the trigger. The enable/disable controller 58 is a solenoid slide release mechanism installed and adjusted to be both behind the firearm trigger at the trigger's nearest and furthest points of motion. The triggering device 60 is the firearm trigger mechanism. The data transmitter 14 is glued to the individual's fingernail. Capacitance plates 34, which are in contact with the human nail 24, form a measurable specific and individualized capacitance (approximately 1.000–25.000 picoFarads), depending upon the individual's fingernail characteristics (e.g., thickness) and the location and area of the capacitance plates 34. A typical capacitance plate 34 may be approximately 5 $mm^2$ in area. The capacitance plates 34 are connected to the inductor 46 to form a resonant circuit.

Next, a key is inserted into the validator controller 12, and the individual places his or her finger on the firearm trigger, pushing his or her finger to engage a push-button switch, powering the human machine interface 10. The validator logic circuit 20 causes a pulse generator in the validator emitter 38 to power the data transmitter 14, capacitance plates 34 and inductor 46 (resonant circuit). This resonant circuit "rings" or oscillates at a specific frequency determined by the value of the inductor 46 and the capacitance of the human nail 24. This frequency or data signal 22 is received by the validator receiver 18, and the exact frequency in MHz is counted by the validator logic circuit 20 and converted to an 8-bit to 36-bit binary number. The validator logic circuit 20 then stores the frequency value in Flash memory PROM in the validator logic circuit 20, which is typically an 8-bit MPU, such as a Motorola MC6811 or a Microchip PIC-based MPU. The key is then removed, and the individual is ready to use the human machine interface 10. Further, the human machine interface 10 powers itself down automatically after 10 minutes of operation without a signal being received by the validator receiver 18. Alternatively, the individual powers down the human machine interface 10 by re-engaging the same push-button switch.

Using the device of this specific example, the individual places his or her finger on the firearm trigger and pushes forward his or her finger to engage a push-button switch, which switches on the power to the validator controller 12. The validator controller 12 uses the same method described above to measure the capacitance or resultant resonant frequency of the human nail conductive circuit 30, and if the value falls within a small percentage range of the value of the initially-introduced frequency value (stored in the validator logic circuit 20 Flash PROM), the validator logic circuit 20 sends current through a solenoid to release the trigger lock mechanism, allowing the trigger to be actuated. The validator controller 12 may also "beep", light a light, vibrate slightly or, at the individual's discretion, indicate to the individual that the firearm is ready for use. The validator controller 12 may also indicate how close the validator controller 12 is from deciding the validity of the individual's current capacitance value, possibly requiring recalibration or re-introduction.

The individual typically performs this action at the beginning of the day to verify continued validation later in the day. The individual would also perform the same procedure to actually fire the firearm, with the exception of releasing the firearm's mechanical safety mechanism. In a non-retrofitted situation, the safety would be wired to the validator controller 12, and the safety would switch power to it and have two positions; one to test the validator controller 12, and a second position to mechanically release the firing mechanism to ready the firearm.

In another specific example of a human machine interface 10 embodiment, wherein the validator controller 12 is mounted on a firearm, a key is inserted into the validator controller 12 and the individual places his or her finger on the firearm trigger and pushes his or her finger forward to engage a push-button switch. The push-button switch powers the validator controller 12 and releases a validator contact spring, allowing it to push forward against the person's fingernail. In this example, the validator contact spring is the direct physical connection element 32. The validator contact spring is gold plated and contacts a large area of gold leaf glued to the individual's fingernail. The validator controller can now read and record the capacitance formed by the gold leaf plate, the individual's fingernail and the conductive flesh underneath the fingernail. This capacitance can be measured by many methods, such as using a switched capacitor circuit with voltage comparators to measure the specific capacitance value. The resulting value is then stored in the Flash PROM in the validator logic circuit 20, typically an 8-bit MPU with Flash or EEPROM non-volatile memory, such as a Motorola MC6811 Series Processor. The key is then removed, and the individual is ready to use the human machine interface 10. The human machine interface 10 powers itself down automatically after 10 minutes of operation without a "reasonable" amount of capacitance being measured, indicating the absence of an individual's finger. Alternatively, the individual powers down the unit by re-engaging the same aforementioned push-button switch.

In operation, the user places his or her finger on the firearm trigger and pushes forward his or her finger to engage a push-button switch, which switches on the power to the validator controller 12 and releases the validator contact spring, allowing it to push forward against the fingernail. The validator controller 12 uses the same method described above to measure the capacitance of the individual's human nail conductive circuit 30, and if the capacitance falls within a small percentage range of the value the individual initially introduced in the previous phase, the validator logic circuit 20 sends current through a solenoid to release the trigger lock mechanism, allowing the trigger to be pulled.

A desirable, but slightly less accurate method of forming and reading the individual's fingernail capacitance characteristic is to use a flexible, spongy, rounded-rectangular or oval-shaped conductive area surface of approximately 3 mm by 5 mm, at the end of the conductive spring, which may conform to the shape of the surface of the human nail 24. This method does not require a gold leaf or any other semi-permanent discoloration or coating on the fingernail. The conductive spring contacts the surface of the fingernail and replaces the semi-permanent capacitor plate normally painted or glued on. Choosing a larger size would further prevent children from using the firearm, because the spongy-plate would contact the flesh on the sides of their considerably smaller finger and would be easily detectable. Upon contact, in this situation, the capacitor would completely "short out". Also, due to a significantly thinner fingernail thickness, a child's capacitance would be significantly higher and would be rejected as out-of-range in the initial introduction phase discussed above.

In yet another specific firearm example, the data transmitter 14 is glued to the individual's fingernail. Capacitance plates 34 are integrated with the data transmitter 14 and are positioned close or in contact with the fingernail to form a measurable specific and individualized capacitance. This specific and individualized capacitance depends on the individual's fingernail characteristics, especially their fingernail thickness, size of their fingernail and the size and location of the capacitance plates 34. As before, a key is inserted into the validator controller 12 and the individual places his or her finger on the firearm trigger and pushes forward to engage a push-button switch and power LEDs in the validator emitter 38, which illuminates and powers the nail solar cell 40 and the data transmitter 14 circuitry. The fingernail solar cells send power to the nail digital chip 42 and nail analog chip 48. The nail analog chip 48 is dedicated to measuring the fingernail capacitance (formed in a capacitance range of 0–25 picoFarads on the finger) and converting that capacitance measurement value to an 8-bit to 32-bit binary number. This binary number, combined with other data, e.g., checksum and serial number, are approximately 60-bits total in the nail digital chip 42. This communication occurs in serial binary fashion through a shift register clocked at typically 200 KHz to an IR emitter LED, which then illuminates the validator receiver 18 (also infrared). The validator logic circuit 20 gets this CMOS-voltage level digital data from the validator receiver 18, verifies the checksum or CRC code, matches the sent capacitance value, and stores the fingernail digital chip 42 serial number and the fingernail capacitance measurement in the Flash memory PROM in the validator logic circuit 20. The key is then removed and the individual is ready to use it. In operation, human machine interface 10 functions as described above. It is envisioned that these firearm applications would be particularly useful in law enforcement applications.

In this manner, the human machine interface 10 is not easily lost by or stolen from an authorized user. Further, the present invention is a security apparatus that is easily retrofitted into existing mechanisms and systems. Also, the human machine interface 10 is unusable or effectively unusable during or after a struggle situation in which the valid user loses possession of his firearm. In addition, the present invention provides a signaling device that produces a substantially non-duplicative or non-discoverable signal, increasing the security aspect of the human machine interface 10.

The embodiments of the invention, which require no permanently mounted device on the fingernail 24, have numerous advantages over prior security and control devices. These include the following: it is inherently capable of being the fastest, least expensive, smallest, most unobtrusive, ergonomic, most rugged, lowest-power biometric device available. It uses little data storage as opposed to retinal or fingerprint biometric devices, which can typically use 100 bytes or more. It can be less objectionable than a fingerprint identification device to individuals who dislike business or government collecting personal data. It can incorporate or be combined with a hidden machine-randomized finger-tactile-generation-response mechanism, which allows verification that the forefinger has not been removed from the individual identified. It leaves no lingering individual data such as a fingerprint. It is small and simple enough to build into a smart card. It discriminates between small children and adults as categories. It inherently has ease of redundancy, i.e. other finger's fingernails can be identified and used as a backup. It is located at a human "decision-point" where intentions are expressed through actions at the tip of the finger. It is a struggle-situation sensitive, i.e., it is more difficult to force an unwilling wearer to perform a verification action than most other biometric devices. It can easily combine multiple devices on multiple fingers for tighter security (up to 10 times). It is extremely difficult to unknowingly or clandestinely read as opposed to other biometric devices. It is especially compatible with firearms. It combines well with a password or pin. If the password is observed, it offers another layer of protection. It is difficult to steal. It requires no user memorization.

The embodiments of the present invention requiring a permanently mounted device on the fingernail also have numerous additional advantages. These include the following: it can be no-contact, and hence sanitary. It can be read/transmitted at a distance. Due to its low power nature, some embodiments can continuously verify the identification of the wearer without affecting the daily activities of the wearer; so even a very sophisticated and brief period of attempting to transfer physical or biometric characteristics to another is detectable. It has a small interface point, therefore, the reader is suitable for interfacing with switches. It allows immediate verification and/or identification while controlling a device such as pressing a switch or operating a device. It is capable of getting instructions, data or information from the wearer. It can easily exchange data with a wearer who is blind or in darkness. It requires a minimum amount of movement to exchange data. It is capable of issuing feedback or data to wearer quickly and invisibly. It is capable of storing data and executing programs including encryption/security programs from an authorized reader. It is capable of exchanging data with readers over a distance. It is capable of allowing the wearer to quickly select other reader-devices to exchange data, actuate or control devices. It can be read sporadically, periodically or continuously by the reader without requiring any additional wearer effort, time or difficulty. For example, a continuous remote read near a computer keyboard to verify an authorized user is using the licensed software. With a speckled randomized "confetti coating", it can present an additional level of security.

The devices disclosed herein have many uses; including:

- MAC machines with or in place of PIN number;
- child-exclusion locks, for example, childproof vending machines;
- locks for children only, for example, household back door locks that only a child's small finger's fingernail can open;
- an appliance on/off/state switch, for example, if a child turns on a TV equipped with this device, it limits access to TV channels appropriate for children;
- fast, cheap, low security locks;
- bike locks built into a bike;
- briefcase or luggage locks;
- beach or cabana locks;
- temporary public locks, for example, gym lockers or Laundromats;
- quick change or quick access locks, for example, for apartments or hotel rooms;
- public lockers, for example, the user puts a quarter in and inserts his finger to re-recognize his identity to the device which then opens to give him access to his belongings;
- standalone padlocks, locks or childproof locks;
- a hotel room safe lock, which does not require the user to establish or remember a combination number;
- a firearm trigger lock;
- military or prison locks that owe value to the devices ruggedness and easily configured ability to trap unauthorized user's finger; and
- one or many human machine interfaces and control or remote control devices.

The use of the security devices disclosed herein which require a permanently mounted device on the nail is not limited to but include the following:

- used as an ultra-secure lock;
- used as a software user validation lock to prevent unauthorized people from using or copying and using commercial software;
- used as an individual identification device which identifies who is pressing, controlling or actuating a switch such as in industrial or military application;
- as an accidental switch actuation inhibitor;
- used for credit card, ecommerce or banking transactions;
- used as a continuous biometric based encryption/decryption key generation and/or verification device for data copy protection or playback authorization;
- used as a means of securely identifying an individual; and
- used as one or many remote control devices.

In another specific example, the data transmitter 14 orientation data may be sent to a validator controller 12 positioned above the hand, and used to control or replace mouse cursor movement or status. In addition, this may be accomplished by using the polarization orientation data for the width axis of the computer screen and use the pitch orientation data for the height axis. A relative pitch orientation may be acquired optically by the validator controller 12 by having the data transmitter 14 reflect a point source signal back to the validator controller 12 using a curved reflective surface on the data transmitter 14. Such a surface could have thin, black, non-reflective lines at periodic intervals on its surface, so that the pitch movement forward or backward would cause the reflection to be periodically interrupted or pulsed. These pulses could be counted and used to calculate a mouse cursor position along the screen height or Y axis. Other electrical or optical methods are envisioned such as tilt meters, directional light sensing arrays, etc. Another more discriminating method of polarization angle detection would utilize two polarization filters at different angles of polarization in the receiving section of the device to be controlled. A calculation based on the signal strength ratios between the two filters and between the filtered and ambient total signal received would more accurately indicate the polarization orientation of the data transmitter 14 polarization filter. It should be noted that to further discriminate between data transmitter 14 signal and background reflected signal, a means of segregating the background from the area that the data transmitter 14 is located in may be economically feasible. This means can be accomplished by devices such as pixel based devices and hardware/software that determines and tracks which pixels contain data transmitter 14 data and their degree of luminance.

It should be noted that generally there is a continuum of complexity and sophistication. The more built into the validator controller 12, the less needed in the data transmitter 14. Therefore the less complex the validator controller 12 is the more complex the data transmitter 14 is needed to achieve the same functionality. This trade-off would be done against user convenience, expense, ruggedness, speed, resolution, number of dimensions of response, size constraints and technological miniaturization progress, etc.

An example of a very simple data transmitter 14 and complex validator controller 12 in a mouse application would be the data transmitter 14 comprising crosshairs whose image is received by the validator controller 12 by standard raster type video cams and the validator controller 12 having a stereoscopic object location tracking system that would return the X,Y,Z location of the crosshairs in space and also the axes angles of x,y,z yielding a 6-D mouse. Alternately the location of a point source of radiation reflecting off a bare, shiny nail can generally less accurately be used to determine orientation or location. Here, all of the computing work is done in validator controller 12 with no active circuitry on the data transmitter 14.

It is possible and/or optimal for an infinite variety of devices that through the allocation and selecting of enhancements such as using selected wavelengths, filters, coherent light, holograms, binary optics, florescence, luminescence, reflectors, reflective coatings, fingernail surface grooves, retroflectors, ultrasound devices, optical gratings, geometric patterns, tilt switches, tiltometers, arrays of optical sensors to determine light source angles, signal strength, polarization, magnets, hall effect sensors, multiple separately gated/sequenced light sources, multiple validator controllers 12 at different viewing angles on either the data transmitter 14 or validator controller 12 to create solutions to reduce the overall complexity of either the data transmitter 14 and/or validator controller 12 or enhance their sensitivity, resoulution, speed, size, distance-useage, cost characteristics or etc.

It is even possible with sufficient optics and image processing power in the validator controller 12 to use the bare nail 24 optical reflection characteristics and the optical image characteristics of the nail 24 versus skin boundary or its optical image and ambient light to enable the validator controller 12 to discern the nail 24 location x,y,z and orientation angles, albeit not as accurately and/or more expensively. This could eventually be done by a cheap CMOS camera located above a LCD screen and facing down towards the keyboard.

Additionally, optically discerning the relative location and movement of all the human nails 24 can create a virtual keyboard or discern a bare handed gesturing as data for inputs or additional security. It may be useful to simply project the keyboard onto a surface beneath the computer monitor.

It is also possible with sufficient optics and validator receiver 18 sophistication to observe the groove configuration of the upper surface of the nail as a data transmitter 14 and use it as a limited biometric for individual validation, without requiring active circuitry as part of the data transmitter 14.

An example of more unique means of creating a psuedo-mouse includes using a hall effect device in the validator controller 12 and a magnet as data transmitter 14, or an ultrasonic means to locate the data transmitter 14 or the validator controller 12 relative to each other, etc.

It should be noted that in many cases, the devices can be mounted on either the data transmitter 14 or the validator controller 12 with either encoding and transmitting the device's signal to the other as needed, feasible and practical. For example, if a smaller or cheaper validator controller 12 in a validator controller 12—data transmitter 14 combination which uses hall effect devices in which many validator controllers 12 for only one data transmitter 14 are needed, the magnet may be mounted on validator controllers 12 and the hall effect device and interface electronics mounted on the data transmitter 14. The data transmitter 14 transmits back the encoded hall effect device's signal to the validator controller 12 via RF for its relative location signal.

Other enhancements may include a black keyboard or black background to absorb light or a white keyboard, which still absorbs radiation in the infrared wavelength used by the data transmitter 14—validator controller 12 combination for enhancing the signal to noise characteristics. A simple psuedo-mouse may also be made by using two tilt switches on the data transmitter 14, the one mounted parallel to the finger for left-stay-right movement and the one mounted perpendicular to the finger for up-stay-down psuedo-mouse movement. Multiple cursors or psuedo-mouse's may be simultaneously moved by using multiple nails 24 with a data transmitter 14 on each.

It also should be noted that unlike most mouse implementations, it does not need a surface. To economize, a two-finger psuedo-mouse may be of value with one finger controlling the horizontal axis and one finger controlling the vertical axis.

Multiple signals from the data transmitter 14 to the validator controller 12 may be more economical in some configurations and so using timing synchronization or a multiplexing of the validator controllers 12 to data transmitters 14 or data transmitters 14 to validator controllers 12 may enable inexpensive discrimination data transmitters 14 or between separate polarized axes on a data transmitter 14 for example.

It is envisioned that MEMS devices such as a MEMS shutter used to create amplitude modulation of the data transmitter 14 or validator controller 12 signal at a specific frequency would help filter noise, carry signals, discriminate between devices in a manner similar to radio.

More unusual methods of locating the data transmitter 14 in space include a 1-D or 2-D scanning array of LCD black Pixels in a grid on the curved surface of a FN to periodically interrupt reflection from validator controller 12, the timing of the interruption to indicate which pixel and hence where the validator controller 12 is relatively located.

Another method of determining the location of the data transmitter 14 relative to the validator controller 12 is to measure the incident angles to the signal source on the data transmitter 14, or validator controller 12 and if measured on the data transmitter 14, return it to the validator controller 12 as encoded signal to indicate nail 24 orientation. This can be done with an array of directional photosensitive receptors, optimally facing slightly different angles, filtered to the validator controller 12 or data transmitter 14 wavelength and determining which receptor has the most signal entering into it. This can also be done by using just three receptors in a triangle configuration, each receptor aiming outward at a different angle and each receptor being most sensitive to signals entering from directly ahead of it. The tilt or position of the data transmitter 14 relative to the validator controller 12 can thus be calculated from the relative signal strengths of the three inputs to yield an X,Y coordinate.

For the security based application, a confetti coating on the nail alone may be considered to be the data transmitter 14 and transparent areas in the confetti coating that allow to transmit deliberately discolored states of the under nail flesh may be used to verify the confetti pattern is mounted on a human nail.

Due to some embodiments of the psuedo-mouse requiring minimal hardware, it is envisioned that the sanitary and touch free simultaneous control of process variables such as the flows and temperatures of water from a kitchen sink are quite feasible and practical with this device. Additionally, due to its user identification capabilities it can protect children from scalding themselves while allowing adults to use the sink effectively.

This invention has been described with reference to the preferred embodiments. Obvious modifications and alterations will occur to others upon reading and understanding the preceding detailed description. It is intended that the invention be construed as including all such modifications and alterations.

I claim:

1. A human machine interface, comprising:

(a) a data transmitter in fixed contact with a human nail for transmitting at least one data signal based upon physical properties of at least one of said human nail and surrounding areas adjacent said human nail;

(b) an adhesive layer between said data transmitter and said human nail, said adhesive layer one of permanently and temporarily securing said data transmitter to said human nail; and (c) a validator controller connected to receive said at least one data signal, process information related to said at least one data signal and perform at least one action based upon processed information.

2. The human machine interface of claim 1, further including: a direct physical connection element between said validator controller and said data transmitter; wherein said at least one data signal is transmitted via said direct physical connection element.

3. The human machine interface of claim 2, wherein said data transmitter includes: at least one capacitance plate secured to said human nail for communicating with said validator controller via said direct physical connection element; and a circuit return conductor.

4. The human machine interface of claim 1, further including a data transmitter power source powering said data transmitter.

5. The human machine interface of claim 1, further including a validator controller power source powering said validator controller.

6. The human machine interface of claim 1, wherein said validator controller further includes a validator emitter for emitting at least one signal towards said data transmitter.

7. The human machine interface of claim 6, wherein said data transmitter further includes at least one capacitance plate secured to said human nail.

8. The human machine interface of claim 7, wherein said data transmitter further includes an inductor in communication with said at least one capacitance plate for emitting said at least one data signal towards said validator controller.

9. The human machine interface of claim 1, further including a recording device for logging specific events occurring within said human machine interface and associated devices.

10. The human machine interface of claim 1, further including: a protective layer covering and protecting said data transmitter; wherein said protective layer does not interfere with communication of data signals between said data transmitter and said validator controller.

11. The human machine interface of claim 1, further including: a protective layer covering and protecting said validator controller; wherein said protective layer does not interfere with communication of data signals between said data transmitter and said validator controller.

12. The human machine interface of claim 1, wherein said validator controller communicates with a controllable device logic circuit in a controllable device, said controllable device logic circuit in communication with said controllable device for controlling said controllable device.

13. The human machine interface of claim 1, further including a timer device in communication with one of said validator controller and said data transmitter to associate a time with an event.

14. The human machine interface of claim 1, wherein said at least one data signal is encrypted prior to communication from said data transmitter to said validator controller.

15. The human machine interface of claim 1, further including a positioning system integrated with said human machine interface for providing human machine interface location information to an external recipient.

16. The human machine interface of claim 15, wherein said positioning system integrated with said human machine interface for providing said human machine interface location information to said external recipient is a Global Positioning System.

17. The human machine interface of claim 1, wherein said at least one data signal transmitted is representative of a change in colorization of flesh under said human nail for verifying that an individual's finger having said data transmitter affixed to said human nail is pressing on a predetermined surface to indicate at least one of said individual wants to perform at least one of an action and transaction and to determine that said individual is alive.

18. The human machine interface of claim 1, wherein said human machine interface further includes a power source for powering a timer device which periodically reads at least one of a pulse and approximate blood oxygen content via at least one of said human nail and said surrounding areas adjacent said human nail to verify at least one of connection of said human nail to a predetermined individual, said predetermined individual is still alive and whether said predetermined individual's pulse indicates that one of said predetermined individual is under duress and under a drugged state.

19. A human machine interface, comprising:

(a) a data transmitter in fixed contact with a human nail, said data transmitter including a nail solar cell for powering said data transmitter and in communication with a nail digital chip, said nail digital chip for transmitting at least one data signal based upon physical properties of at least one of said human nail and surrounding areas adjacent said human nail; and (b) a validator controller connected to interface with said data transmitter, said validator controller including a validator receiver for receiving said at least one data signal transmitted from said data transmitter, a validator logic circuit for processing information related to said at least one data signal received by said validator receiver, a validator status actuator for performing at least one action based upon information processed by said validator logic circuit and a validator emitter for emitting at least one signal towards said data transmitter.

20. The human machine interface of claim 19, further including: a direct physical connection element between said validator receiver and said data transmitter; wherein said at least one data signal is transmitted via said direct physical connection element.

21. The human machine interface of claim 20, wherein said data transmitter further includes a nail analog chip in communication with said nail digital chip.

22. The human machine interface of claim 21, wherein said data transmitter further includes: at least one capacitance plate secured to said human nail for communicating with said nail analog chip; and a circuit return conductor.

23. The human machine interface of claim 19, wherein said data transmitter further includes a nail signal emitter for emitting said at least one data signal towards said validator receiver.

24. The human machine interface of claim 23, wherein said data transmitter further includes a nail analog chip in communication with said nail digital chip.

25. The human machine interface of claim 24, wherein said data transmitter further includes at least one capacitance plate secured to said human nail for communicating with said nail analog chip.

26. A human machine interface, comprising:

(a) a data transmitter in fixed contact with a human nail for transmitting at least one data signal based upon at least one of relative position, state, motion and acceleration of at least one of said human nail and surrounding areas adjacent said human nail, with respect to an external point;

(b) an adhesive layer between said data transmitter and said human nail, said adhesive layer one of permanently and temporarily securing said data transmitter to said human nail; and (c) a validator controller connected to interface with said data transmitter, said validator controller including:

(i) a validator receiver for receiving said at least one data signal transmitted from said data transmitter, (ii) a validator logic circuit for processing information related to said at least one data signal received by said validator receiver, and (iii) a validator status actuator for performing at least one action based upon information processed by said validator logic circuit.

27. The human machine interface of claim 26, wherein said validator controller further includes a validator emitter for emitting at least one signal towards said data transmitter.

28. The human machine interface of claim 27, further including: a directional reflector for reflecting said at least one signal from said validator emitter only when received at a predetermined angle; and an electronic shutter adjacent said directional reflector for modulating said at least one data signal from said validator emitter; wherein said at least one data signal from said validator emitter is received through said electronic shutter and by said directional reflector, and said at least one data signal from said validator emitter is reflected and modulated by said directional reflector, towards said validator controller.

29. The human machine interface of claim 26, wherein said data transmitter further includes a nail digital chip containing at least one computer program.

30. The human machine interface of claim 26, wherein said at least one data signal communicated from said data transmitter to said validator controller is a correlation between a first spatial point associated with said data transmitter and a second spatial point.

31. The human machine interface of claim 30, wherein said first spatial point is adjacent a user's nail and said second spatial point is on a screened monitor.

32. The human machine interface of claim 26, wherein said human machine interface further includes a means for illuminating at least one of said human nail and said areas adjacent said human nail, one of said data transmitter and said validator receiver for detecting colorization of flesh under said human nail being illuminated and verifying that an individual having said data transmitter affixed to said human nail is alive.

33. A method of creating a human machine interface for at least one of enabling and disabling an event and identifying which human nail is used to perform a task, comprising the steps of:

(a) affixing a data transmitter to at least one human nail with an adhesive layer between said data transmitter and said human nail, said adhesive layer one of permanently and temporarily securing said data transmitter to said human nail, said data transmitter for transmitting at least one data signal based upon physical properties of at least one of said at least one human nail and surrounding areas adjacent said at least one human nail;

(b) interfacing a validator controller with said data transmitter;

(c) receiving said at least one data signal transmitted from said data transmitter to said validator controller;

(d) processing information related to said at least one data signal received in said validator controller; and (e) performing at least one action based upon information processed by said validator controller.

34. A human machine interface, comprising:

(a) a data transmitter in fixed contact with a human nail, said data transmitter including a sensor in communication with a nail analog chip, said nail analog chip in communication with a nail digital chip, said nail digital chip for transmitting at least one data signal based upon at least one of relative position, state, motion and acceleration of at least one of said human nail and surrounding areas adjacent said human nail, with respect to an external point; and (b) a validator controller connected to interface with said data transmitter, said validator controller including a validator receiver for receiving said at least one data signal transmitted from said data transmitter, a validator logic circuit for processing information related to said at least one data signal received by said validator receiver, and a validator status actuator for performing at least one action based upon information processed by said validator logic circuit.

35. A human machine interface, comprising:

(a) a data transmitter in fixed contact with a human nail for transmitting at least one data signal based upon at least one of relative position, state, motion and acceleration of at least one of said human nail and surrounding areas adjacent said human nail, with respect to an external point;

(b) an adhesive layer between said data transmitter and said human nail, said adhesive layer one of permanently and temporarily securing said data transmitter to said human nail; and (c) a validator controller connected to receive said at least one data signal, process information related to said at least one data signal and perform at least one action based upon processed information.

36. The human machine interface of claim 35, wherein said at least one data signal transmitted is representative of a change in colorization of flesh under said human nail for verifying that an individual's finger having said data transmitter affixed to said human nail is pressing on a predetermined surface to indicate at least one of said individual wants to perform at least one of an action and transaction and to determine that said individual is alive.

37. The human machine interface of claim 35, wherein said human machine interface further includes a power source for powering a timer device which periodically reads at least one of a pulse and approximate blood oxygen content via at least one of said human nail and said surrounding areas adjacent said human nail to verify at least one of connection of said human nail to a predetermined individual, said predetermined individual is still alive and whether said predetermined individual's pulse indicates that one of said predetermined individual is under duress and under a drugged state.

38. A security apparatus, comprising:

(a) a data transmitter in fixed contact with a human nail for transmitting at least one data signal based upon physical properties of at least one of said human nail and surrounding areas adjacent said human nail;

(b) an adhesive layer between said data transmitter and said human nail, said adhesive layer one of permanently and temporarily securing said data transmitter to said human nail; and (c) a validator controller interfaced with said data transmitter, said validator controller including:

(i) a validator receiver for receiving said at least one data signal transmitted from said data transmitter, (ii) a validator logic circuit for processing information related to said at least one data signal received by said validator receiver, and (iii) a validator status actuator for performing at least one action based upon information processed by said validator logic circuit.

* * * * *